US011193008B2

(12) United States Patent
Lue et al.

(10) Patent No.: US 11,193,008 B2
(45) Date of Patent: Dec. 7, 2021

(54) METHODS FOR MAKING POLYOLEFIN POLYMER COMPOSITIONS

(71) Applicant: ExxonMobil Chemical Patents Inc., Baytown, TX (US)

(72) Inventors: Ching-Tai Lue, Sugarland, TX (US); Mark K. Davis, Humble, TX (US); Wesley R. Mariott, Freeport, TX (US); Daniel P. Zilker, Easton, PA (US); Phuong A. Cao, Old Bridge, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 85 days.

(21) Appl. No.: 16/604,323

(22) PCT Filed: Mar. 23, 2018

(86) PCT No.: PCT/US2018/024074
§ 371 (c)(1),
(2) Date: Oct. 10, 2019

(87) PCT Pub. No.: WO2018/191000
PCT Pub. Date: Oct. 18, 2018

(65) Prior Publication Data
US 2020/0056026 A1 Feb. 20, 2020

Related U.S. Application Data

(60) Provisional application No. 62/483,596, filed on Apr. 10, 2017.

(51) Int. Cl.
*C08L 23/08* (2006.01)
*C08F 210/16* (2006.01)
*C08F 4/76* (2006.01)
*C08F 4/64* (2006.01)
*C08F 4/659* (2006.01)
*C08F 4/6592* (2006.01)

(52) U.S. Cl.
CPC ...... *C08L 23/0815* (2013.01); *C08F 4/64193* (2013.01); *C08F 4/65904* (2013.01); *C08F 4/65925* (2013.01); *C08F 210/16* (2013.01); *C08L 2205/02* (2013.01); *C08L 2314/06* (2013.01)

(58) Field of Classification Search
CPC ............... C08F 210/16; C08F 2205/02; C08F 2205/025; C08F 2500/11; C08F 4/64193; C08L 23/08
USPC ........................................................ 525/240
See application file for complete search history.

(56) References Cited

U.S. PATENT DOCUMENTS

| 4,530,914 A | 7/1985 | Ewen et al. |
| 4,614,764 A * | 9/1986 | Colombo .................. C08J 5/18 525/193 |
| 4,937,299 A | 6/1990 | Ewen et al. |
| 5,470,811 A | 11/1995 | Jejelowo et al. |
| 5,516,848 A | 5/1996 | Canich et al. |
| 5,696,045 A | 12/1997 | Winter et al. |
| 6,492,472 B2 | 12/2002 | Lue et al. |
| 6,573,343 B1 * | 6/2003 | Follestad ................. C08F 10/00 525/240 |
| 6,734,265 B1 * | 5/2004 | Dekmezian ........... C08F 210/16 525/240 |
| 6,844,389 B2 * | 1/2005 | Mehta ...................... C08K 9/04 524/236 |
| 6,875,816 B2 * | 4/2005 | DeGroot ................. C08L 23/04 525/240 |
| 7,141,632 B2 | 11/2006 | Vaughan et al. |
| 7,163,906 B2 | 1/2007 | McDaniel et al. |
| 7,172,987 B2 | 2/2007 | Kao et al. |
| 7,196,138 B2 * | 3/2007 | Starita ..................... C08L 23/06 525/191 |
| 8,022,142 B2 * | 9/2011 | Jiang ....................... C08L 23/16 525/191 |
| 8,088,704 B2 | 1/2012 | Kolb et al. |
| 8,101,685 B2 * | 1/2012 | Jiang ....................... C08L 23/08 525/191 |
| 8,410,217 B2 * | 4/2013 | Tse .......................... C08L 23/06 525/191 |
| 8,455,601 B2 * | 6/2013 | Kolb ........................ C07F 17/00 526/348 |
| 8,497,325 B2 * | 7/2013 | Tse ....................... C08L 23/0815 525/191 |
| 8,586,497 B2 * | 11/2013 | Kolb ........................ C08F 10/00 502/113 |
| 8,598,287 B2 | 12/2013 | Kuo et al. |
| 8,653,196 B2 * | 2/2014 | Mazzola .................... C08J 5/18 525/194 |
| 8,822,601 B2 * | 9/2014 | Karjala ............... C08L 23/0815 525/191 |
| 8,835,569 B2 * | 9/2014 | Effler ...................... C08L 23/06 525/191 |
| 8,835,577 B2 | 9/2014 | Rix et al. |
| 8,987,382 B2 * | 3/2015 | Demirors .................. C08F 8/30 525/194 |
| 9,096,745 B2 * | 8/2015 | Lam ....................... C08L 23/08 |
| 9,447,265 B2 * | 9/2016 | Lam ....................... C08L 23/08 |
| 9,714,305 B2 | 7/2017 | Wagner et al. |
| 10,155,826 B2 | 12/2018 | Holtcamp et al. |
| 10,533,063 B2 | 1/2020 | Ye et al. |
| 10,808,049 B2 | 10/2020 | Rix et al. |
| 2004/0220359 A1 | 11/2004 | Abhari et al. |
| 2009/0306323 A1 | 12/2009 | Kolb et al. |
| 2011/0136982 A1 | 6/2011 | Tse et al. |
| 2015/0274856 A1 * | 10/2015 | Berbee ............. C09D 123/0869 521/143 |
| 2016/0083568 A1 * | 3/2016 | den Doelder ....... C08L 23/0807 525/240 |

* cited by examiner

*Primary Examiner* — Rip A Lee
(74) *Attorney, Agent, or Firm* — ExxonMobil Chemical Patents Inc.—Law Department

(57) ABSTRACT

A method for increasing the melt strength of a polyolefin polymer composition is provided. The method includes mixing a first polyolefin composition derived from at least one olefin polymerization catalyst (a) and at least one olefin polymerization catalyst (b) with a second polyolefin composition derived from the at least one olefin polymerization catalyst (b) or from at least one olefin polymerization catalyst (c), and obtaining the polyolefin polymer composition.

13 Claims, 2 Drawing Sheets

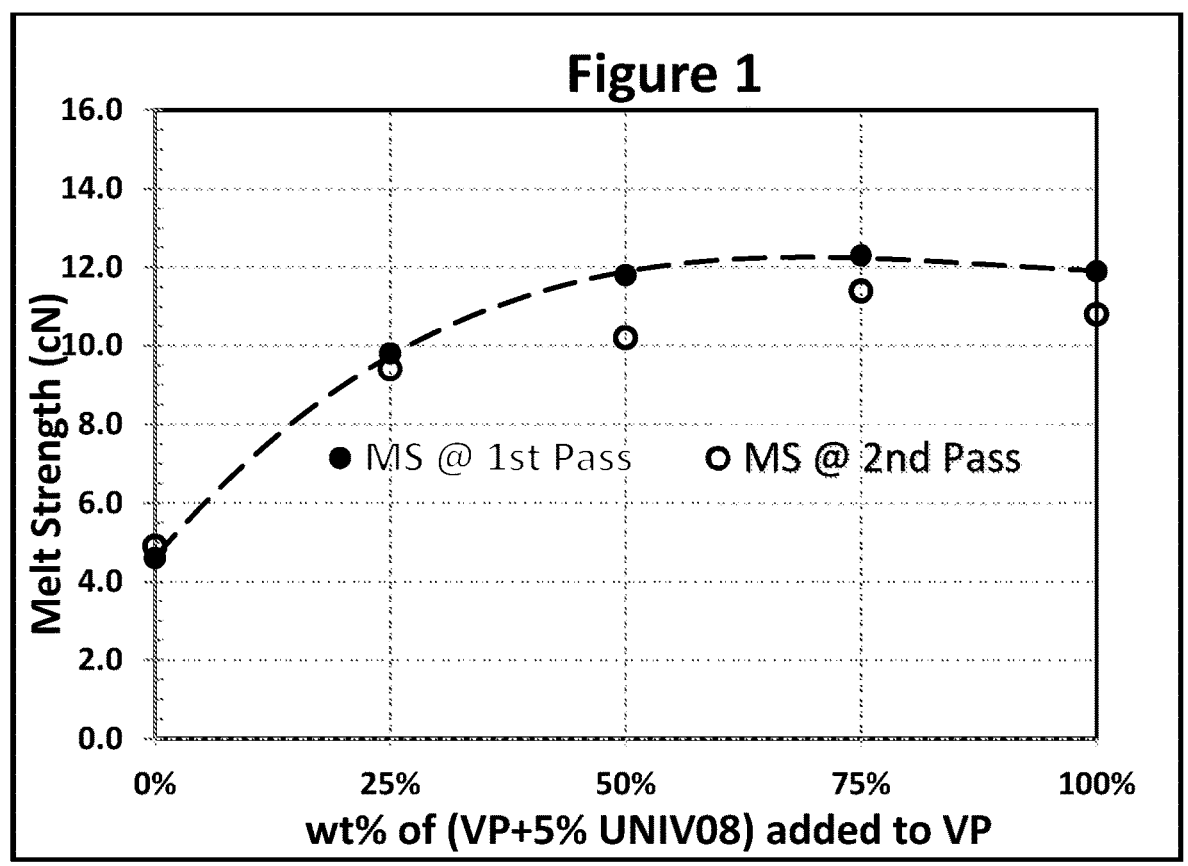

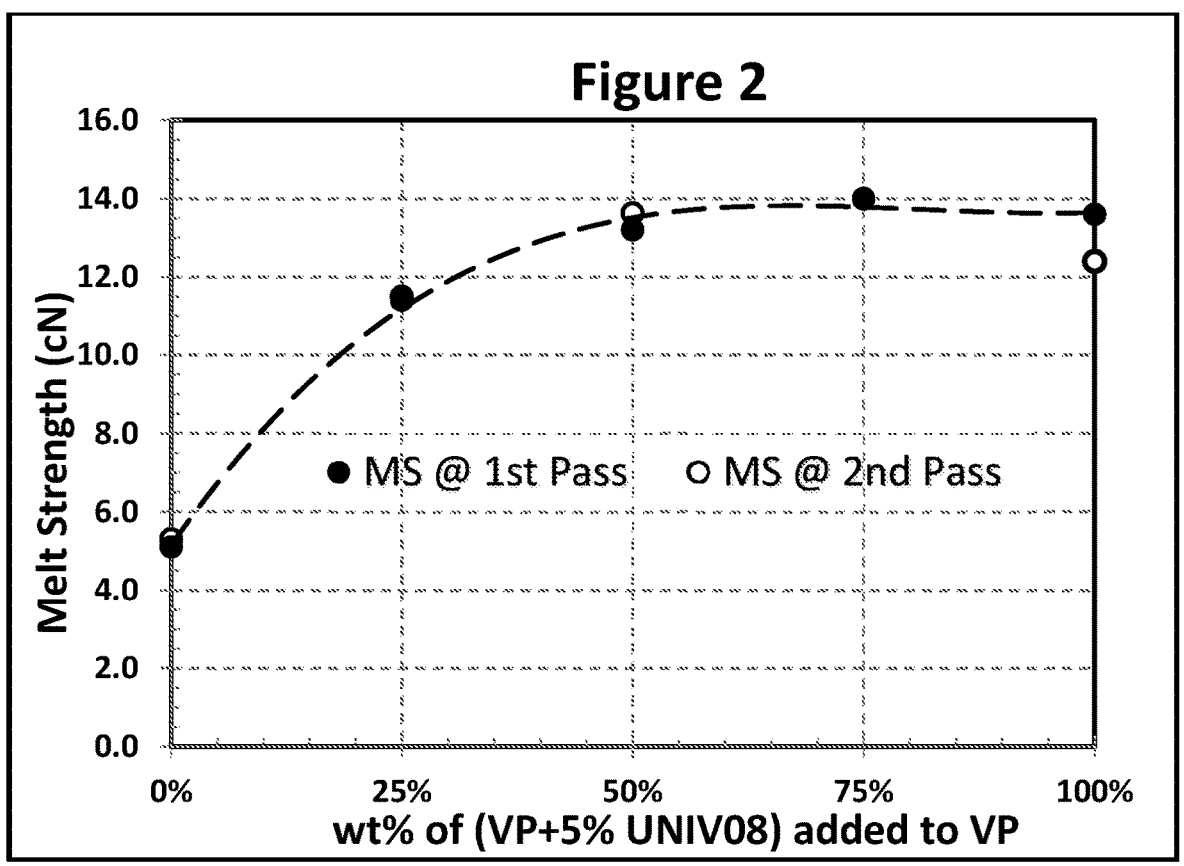

METHODS FOR MAKING POLYOLEFIN POLYMER COMPOSITIONS

CROSS-REFERENCE OF RELATED APPLICATIONS

This application is a National Phase Application claiming priority to PCT Application Serial No. PCT/US2018/024074, filed Mar. 23, 2018, which claims the benefit of U.S. Provisional Application No. 62/483,596, filed Apr. 10, 2017 the disclosures of which are hereby incorporated by reference in their entirety.

FIELD OF THE INVENTION

The invention relates to methods for making polyolefin polymer compositions. In particular, the invention relates for increasing the melt strength of polyolefin polymer compositions.

BACKGROUND OF THE INVENTION

The use of metallocene catalysts in polymerization processes to produce polyolefin polymers is known and has gained much notoriety in the global market place. However, there remains an ongoing effort to develop catalyst systems comprising metallocene catalysts, polymerization processes using such catalyst systems, and polyolefin polymers and products made therewith, each having advantageous properties and performance extending beyond recent advancements in the art. See, for example, U.S. Pat. Nos. 4,530,914; 4,937,299; 5,470,811; 5,516,848; 5,696,045; 6,492,472; 7,141,632; 7,163,906; and 7,172,987.

In particular, an area of focus for polyolefin polymers made from catalyst systems including at least one metallocene catalyst has been directed the processability of these polymers. Processability generally refers to the ability to economically process and shape a polymer uniformly. Processability involves such elements as how easily the polymer flows, melt strength, and whether or not the extrudate is distortion free. See, for example, U.S. Pat. No. 8,598,287. Historically metallocene catalyzed polyethylenes (mPE) are somewhat more difficult to process than low-density polyethylenes (LDPE) made in high-pressure polymerization processes. Generally, mPEs require more motor power and produce higher extruder pressures to match the extrusion rate of LDPEs. Typical mPEs also have lower melt strength which, for example, adversely affects bubble stability and drawdown capability during blown film extrusion, and they are prone to melt fracture at commercial shear rates. Nevertheless, mPEs exhibit superior physical properties as compared to LDPEs that make mPEs so attractive in the market place.

As a result, it is not unusual in the industry to add various levels of an LDPE to an mPE to increase melt strength, to increase shear sensitivity, i.e., to increase flow at commercial shear rates and to reduce the tendency of melt fracturing. Despite these efforts, these blends generally have poor mechanical properties as compared with neat mPE.

Traditionally, metallocene catalysts produce polymers having a narrow molecular weight distribution. Narrow molecular weight distribution polymers tend to be more difficult to process. Generally, the broader the polymer molecular weight distribution, the easier the polymer is to process. A technique to improve the processability of mPEs is to broaden the products' molecular weight distribution (MWD) by blending two or more mPEs with significantly different molecular weights or by changing to a polymerization catalyst or mixture of catalysts that produce broad MWD polymers.

For example, U.S. Publication No. 2009/0306323 discloses a film of an ethylene polymer comprising: an ethylene polymer produced in a gas phase process comprising a catalyst system comprising a first catalyst compound and a second catalyst compound disposed on a support, wherein the first catalyst compound is a metallocene catalyst compound; and wherein the second catalyst compound has the following formula I:

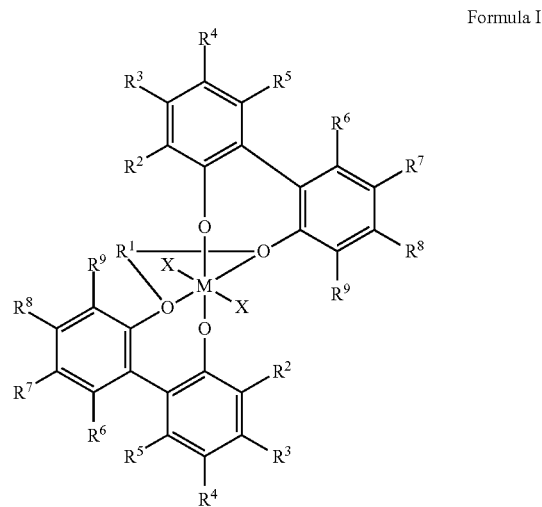

Formula I wherein M is selected from the group consisting of Ti, Zr, and Hf; each $R^1$ through $R^9$ may be independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; wherein X is least one leaving group; and optionally, a cocatalyst; wherein the film of the ethylene polymer has improved gloss as determined by ASTM D2457-08, a reduced haze as determined by ASTM D2103-08, an improved dart drop impact strength as determined by ASTM D1709, and improved Elmendorf Tear in the machine direction as determined by ASTM 1922, an improved Elmendorf Tear in the Transverse direction as determined by ASTM 1922, or a combination thereof, when compared to a comparative film produced in essentially the same way from a comparative resin, the comparative resin produced in essentially the same way using essentially the same components except that the comparative resin is produced in the absence of the second catalyst compound. Improved melt strength is also shown in the "spider web" charts in FIGS. 1-4. See also U.S. Pat. No. 8,586,497.

Despite these past endeavors, there remains a need to improve the melt strength of polyolefin polymer compositions that offer greater processability and other benefits.

SUMMARY OF THE INVENTION

Embodiments disclosed herein provide for a method for increasing the melt strength of a polyolefin polymer composition, the method comprising: mixing a first polyolefin composition derived from at least one olefin polymerization catalyst (a) and at least one olefin polymerization catalyst (b) with a second polyolefin composition derived from the at least one olefin polymerization catalyst (b) or from at least one olefin polymerization catalyst (c), and obtaining the polyolefin polymer composition.

In any of the embodiments described herein, the polyolefin polymer composition may comprise from 50 wt % to 99 wt % of the first polyolefin composition and from 50 wt % to 1 wt % of the second polyolefin composition, based upon the total weight of the polyolefin polymer composition.

In any of the embodiments described herein, the polyolefin polymer composition may comprise from 65 wt % to 99 wt % of the first polyolefin composition and from 35 wt % to 1 wt % of the second polyolefin composition, based upon the total weight of the polyolefin polymer composition.

In any of the embodiments described herein, the polyolefin polymer composition may comprise from 75 wt % to 99 wt % of the first polyolefin composition and from 25 wt % to 1 wt % of the second polyolefin composition, based upon the total weight of the polyolefin polymer composition.

Other embodiments of the invention are described and claimed herein and are apparent by the following disclosure.

BRIEF DESCRIPTION OF THE DRAWINGS

FIG. 1 and FIG. 2 are plots of the melt strength of certain examples of polyolefin polymer compositions as the concentration of one polymer component changes in the polyolefin polymer compositions.

DETAILED DESCRIPTION OF THE INVENTION

Before the present compounds, components, compositions, and/or methods are disclosed and described, it is to be understood that unless otherwise indicated this invention is not limited to specific compounds, components, compositions, reactants, reaction conditions, ligands, metallocene and/or other catalyst structures, or the like, as such may vary, unless otherwise specified. It is also to be understood that the terminology used herein is for the purpose of describing particular embodiments only and is not intended to be limiting.

For the purposes of this patent specification and the claims thereto, the term terms "cocatalyst" and "activator" are used herein interchangeably and are defined to be any compound which can activate any one of the catalyst compounds described herein by converting the neutral catalyst compound to a catalytically active catalyst compound cation. The term "catalyst" refers to a metal compound that when combined with an activator polymerizes olefins, and the term "catalyst system" refers to the combination of a catalyst and an activator with a support. The terms "support" or "carrier," for purposes of this patent specification, are used interchangeably and generally refers to any medium upon which a catalyst optionally with other materials may be contacted with or disposed thereon.

"Catalyst system" is used to describe a catalyst compound/activator combination, optionally with other materials. For example, it may mean the unactivated catalyst complex (pre-catalyst) together with an activator and, optionally, a co-activator. When it is used to describe the combination after activation, it means the activated complex and the activator or other charge-balancing moiety. The transition metal compound may be neutral as in a pre-catalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst, catalyst precursor, pre-catalyst compound, catalyst compound, transition metal complex, or transition metal compound, and these terms are used interchangeably. A "polymerization catalyst system" or simply an "olefin polymerization catalyst" is a catalyst system that can polymerize monomers to polymers.

An "anionic ligand" is a negatively charged ligand which donates one or more pairs of electrons to a metal ion. A "neutral donor ligand" is a neutrally charged ligand which donates one or more pairs of electrons to a metal ion. "Activator" and "co-catalyst" are also used interchangeably and generally refer to a catalyst system component that is capable of changing a catalyst into a form that can polymerize monomers to polymers.

A "scavenger" is a compound that is typically added to facilitate polymerization by removing and/or inhibiting impurities. Some scavengers may also act as activators and may be referred to as co-activators. A "co-activator," that is not a scavenger, may also be used in conjunction with an activator in order to form an active catalyst. Often, a co-activator can be pre-mixed with the transition metal compound to form an alkylated transition metal compound.

As used herein, the new notation for the Periodic Table Groups is used as described in Chemical and Engineering News, 63(5), 27 (1985), unless otherwise noted.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, isoamyl, hexyl, octyl cyclopropyl, cyclobutyl, cyclopentyl, cyclohexyl, cyclooctyl, and the like, including their substituted analogues. Substituted hydrocarbyl radicals are radicals in which at least one hydrogen atom of the hydrocarbyl radical has been substituted with at least one halogen (such as, for example, Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring. For purposes of this disclosure, "hydrocarbenyl" means a hydrocarbyl radical containing at least one olefinic double bond.

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene and or propylene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. An ethylene polymer (or ethylene copolymer) is a polymer having at least 50 mol %, 60 mol %, 70 mol %, 80 mol %, or 90 mol % of ethylene, a propylene polymer (or propylene copolymer) is a polymer having at least 50 mol %, 60 mol %, 70 mol %, 80 mol %, or 90 mol % of propylene, and so on.

For the purposes of this invention and the claims thereto, the term "alpha olefin" or "α-olefin" refers to an olefin where the carbon-carbon double bond occurs between the alpha and beta carbons of the chain. Alpha olefins may be represented by the formula: $H_2C=CH-R^*$, wherein each $R^*$ is independently, hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, dodecyl, and substituted analogs thereof. For example, ethylene, propylene, 1-butene, 1-pentene, 1-hexene, 1-heptene, 1-octene, 1-nonene, and 1-decene are alpha olefins that are particularly useful in embodiments herein. For the purposes of this invention, ethylene shall be considered an alpha-olefin.

A "metallocene" catalyst or compound is defined as an organometallic compound with at least one π-bound cyclopentadienyl moiety (or substituted cyclopentadienyl moiety) and more frequently two π-bound cyclopentadienyl moieties or substituted cyclopentadienyl moieties.

Unless otherwise noted all melting points (Tm) are DSC second melt.

The term "continuous" means a system that operates without interruption or cessation. For example, a continuous process to produce a polymer would be one where the reactants are continually introduced into one or more reactors and polymer product is continually withdrawn. However, a continuous system does contemplate some downtime for normal maintenance, upgrade, "debottlenecking," and/or idling due to market factors.

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bz is benzyl, MAO is methylalumoxane, MMAO is modified methylalumoxane, Ind is indenyl, Cp is cyclopentadienyl, Flu is fluorenyl, TnOAl is tri-n-octyl aluminum, and RT is room temperature or ambient temperature (~23° C.–25° C., unless otherwise indicated).

In a class of embodiments, the invention provides for a method for increasing the melt strength of a polyolefin polymer composition, the method comprising: mixing a first polyolefin composition derived from at least one olefin polymerization catalyst (a) and at least one olefin polymerization catalyst (b) with a second polyolefin composition derived from the at least one olefin polymerization catalyst (b), and obtaining the polyolefin polymer composition. The melt strength of a polymer at a particular temperature may be determined with a Gottfert Rheotens Melt Strength Apparatus. To determine the melt strength, a polymer melt strand extruded from a capillary die is gripped between two counter-rotating wheels on the apparatus. The take-up speed is increased at a constant acceleration of 2.4 mm/sec$^2$. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

In several embodiments of the invention, a polyolefin polymer composition may comprise a first polyolefin composition and a second polyolefin composition, wherein the polyolefin polymer composition may have a melt strength of 10% or greater, 15% or greater, 20% or greater, 25% or greater, 30% or greater, or 35% or greater, than the melt strength of either the first polyolefin composition and/or the second polyolefin composition.

Without being bound to theory, it is believed that polyolefin polymer compositions made from different species of polymer components, i.e., derived or polymerized from different catalysts, optionally, at different reactor conditions, must not only have a high molecular weight species present but the different polymer components must exhibit some minimum level of "entanglement" to obtain good melt strength. Entanglement represents a certain degree of interspersion or distribution of the different polymer components at the molecular level, perhaps, even with some chemical interaction, in the polyolefin polymer composition. Thus, when entanglement of the different polymer components occurs or at least to some level of entanglement, improvements in melt strength and/or strain hardening may be achieved. Surprisingly, such improvements may even surpass the melt strengths and strain hardening of each individual polymer component when measured separately.

As such, the polyolefin polymer compositions may have a melt strength of 9 cN or greater, 10 cN or greater, 11 cN or greater, 12 cN or greater, 13 cN or greater, or 14 cN or greater.

The olefin polymerization catalyst may include any of the following catalysts.

Olefin Polymerization Catalyst

Metallocene Catalysts

The at least one olefin polymerization catalyst may comprise one or more metallocene catalysts, for example, at least one olefin polymerization catalyst (a) or (c). Often, the metallocene catalyst compounds for use herein are represented by the formula (I):

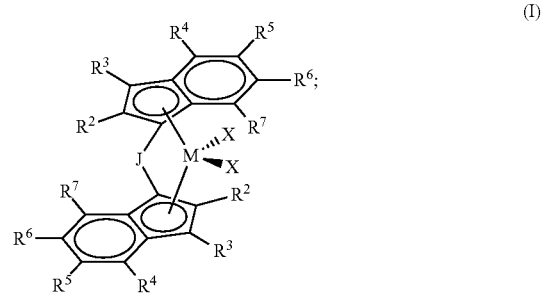

or by the formula (I):

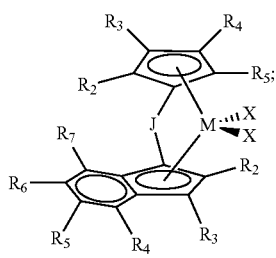

(II)

where: (1) J is a divalent bridging group (preferably comprising C, Si, or both); (2) M is a group 4 transition metal (preferably Hf or Zr); (3) each X is independently an anionic ligand, or two Xs are joined and bound to the metal atom to form a metallocycle ring, or two Xs are joined to form a chelating ligand, a diene ligand, or an alkylidene ligand; and (4) each $R^2$, $R^3$, $R^4$, $R^5$, $R^6$, and $R^7$ is independently hydrogen, $C_1$-$C_{50}$ substituted or unsubstituted hydrocarbyl (such as $C_1$-$C_{50}$ substituted or unsubstituted halocarbyl), provided that any one or more of the pairs $R^4$ and $R^5$, $R^5$ and $R^6$, and $R^6$ and $R^7$ may optionally be bonded together to form a saturated or partially saturated cyclic or fused ring structure.

In any embodiment, each X may be, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments of the invention, each X is independently selected from halides and $C_1$ to $C_5$ alkyl groups. For instance, each X may be a chloro, bromo, methyl, ethyl, propyl, butyl, or pentyl group. In specific embodiments, each X is a methyl group.

In any embodiment, each $R^2$, $R^3$, $R^4$, $R^5$, $R^6$, and $R^7$ may be independently hydrogen, hydrocarbyl or substituted hydrocarbyl; preferably selected from the group consisting of: H, $CH_3$; $H_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2C(CH_3)_3$; $CH_2Si(CH_3)_3$; $CH_2Ph$; $C_3H_5$; $C_4H_9$; $C_5H_9$; $C_6H_{11}$; $C_7H_{13}$; $C_8H_{15}$; $C_9H_{17}$; $CH_2Si(CH_3)_3$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$.

Often, each $R^2$, $R^3$, $R^4$, $R^5$, $R^6$, and $R^7$ is independently selected from hydrogen, or $C_1$-$C_{10}$ alkyl (preferably hydrogen, methyl, ethyl, propyl, butyl, pentyl, heptyl, hexyl, octyl, nonyl, decyl or an isomer thereof). Often, each $R^3$ is hydrogen; each $R^4$ is independently a $C_1$-$C_{10}$ alkyl (preferably methyl, ethyl, propyl, butyl, pentyl, heptyl, hexyl, octyl, nonyl, decyl or an isomer thereof); each $R^2$, and $R^7$ are independently hydrogen, or $C_1$-$C_{10}$ alkyl (preferably hydrogen, methyl, ethyl, propyl, butyl, pentyl, heptyl, hexyl, octyl, nonyl, decyl or an isomer thereof); each $R^5$ and $R^6$ are independently hydrogen, or $C_1$-$C_{50}$ substituted or unsubstituted hydrocarbyl (preferably hydrogen, methyl, ethyl, propyl, butyl, pentyl, heptyl, hexyl, octyl, nonyl, decyl or an isomer thereof); and $R^4$ and $R^5$, $R^5$ and $R^6$, and/or $R^6$ and $R^7$ may optionally be bonded together to form a ring structure.

In any embodiment, each $R^2$ may independently be a $C_1$ to $C_3$ alkyl group, preferably methyl, ethyl, n-propyl, isopropyl or cyclopropyl, each $R^3$, $R^5$, $R^6$, and $R^7$ may be hydrogen, and each $R^4$ may independently be a $C_1$ to $C_4$ alkyl group, preferably methyl, ethyl, n-propyl, cyclopropyl, or n-butyl. Alternatively, each $R^2$ may be a $C_1$ to $C_3$ alkyl group, preferably methyl, ethyl, n-propyl, isopropyl or cyclopropyl, each $R^3$, $R^5$, and $R^6$ may be hydrogen, and $R^4$ and $R^7$ may be, independently, a $C_1$ to $C_4$ alkyl group, preferably methyl, ethyl, propyl, butyl, or an isomer thereof. Yet, alternatively, each $R^2$, $R^4$, and $R^7$ may independently be methyl, ethyl, or n-propyl, each $R^5$ and $R^6$ may independently be a $C_1$ to $C_{10}$ alkyl group, preferably methyl, ethyl, propyl, butyl, pentyl, heptyl, hexyl, octyl, nonyl, decyl or an isomer thereof, $R^3$ may be hydrogen, and $R^5$ and $R^6$ may be joined together to form a 5-membered partially unsaturated ring. Often, each $R^2$, $R^4$, and $R^7$ are the same and are selected from the group consisting of $C_1$ to $C_3$ alkyl group, preferably methyl, ethyl, propyl, and isomers thereof, and $R^3$, $R^5$, and $R^6$ are hydrogen.

Often, $R^4$ is not an aryl group (substituted or unsubstituted). An aryl group is defined to be a single or multiple fused ring group where at least one ring is aromatic. A substituted aryl group is an aryl group where a hydrogen has been replaced by a heteroatom or heteroatom containing group. Examples of substituted and unsubstituted aryl groups include phenyl, benzyl, tolyl, carbazolyl, naphthyl, and the like. Likewise, often, $R^2$, $R^4$, and $R^7$ are not a substituted or unsubstituted aryl group. Likewise, often, $R^2$, $R^4$, $R^5$, $R^6$, and $R^7$ are not a substituted or unsubstituted aryl group.

J may be represented by the formula (III):

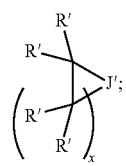

(III)

wherein J' is a carbon or silicon atom, x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In any embodiment, J may be represented by the formula $(R^a{}_2J')_n$ where each J' is independently C or Si, n is 1 or 2, and each $R^a$ is, independently, $C_1$ to $C_{20}$ substituted or unsubstituted hydrocarbyl, provided that two or more $R^a$, optionally, may be joined together to form a saturated or partially saturated or aromatic cyclic or fused ring structure that incorporates at least one J'. Particular examples of J groups include dimethylsilylene, diethylsilylene, isopropylene, ethylene, and the like.

Often, the metallocene compound used herein is at least 90% rac isomer and the indenyl groups are substituted at the 4 position with a $C_1$ to $C_{10}$ alkyl group, the 3 position is hydrogen, the bridge is carbon or silicon which is incorporated into a 4, 5, or 6 membered ring. For instance, the catalyst compound may either the rac or meso form of cyclotetramethylenesilylene-bis(2,4,7-trimethylinden-1-yl) hafnium dimethyl, represented by the formula (IVa):

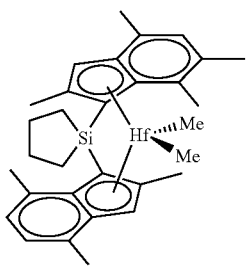

(IVa)

As noted, the catalyst compounds can be in rac or meso form. For instance, at least 90 wt % of the catalyst compound may be in the rac form, based upon the weight of the rac and meso forms present. More particularly, at least any one of about 92 wt %, 93 wt %, 94 wt %, 95 wt %, 96 wt %, 97 wt %, 98 wt %, and 99 wt % of the catalyst compound may be in rac form. For example, all of the catalyst compound may be in rac form.

In a class of embodiments, the metallocene catalyst may be represented by the formula (IVb):

$$(Cp^1R^1_m)Y_n(Cp^2R^2_p)MX_q \qquad (IVb),$$

wherein: $Cp^1$ and $Cp^1$ are the same or different cyclopentadienyl rings; $R^1$ and $R^2$ are each, independently, a halogen, a hydrogen, or a hydrocarbyl, halocarbyl, hydrocarbyl-substituted organometalloid or halocarbyl-substituted organometalloid group having 1 to 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; Y is a bridging group; n is the number of atoms in the direct chain between the two ligands and is 0 to 8; M is a transition metal having a valence of from 3 to 6; each X is, independently, a hydrogen, a halogen, or a hydrocarbyl, oxyhydrocarbyl, halocarbyl, hydrocarbyl-substituted organometalloid, oxyhydrocarbyl-substituted organometalloid, or halocarbyl-substituted organometalloid group having 1 to 20 carbon atoms; and q is equal to the valence of M minus 2.

In another class of embodiments, the metallocene catalyst may comprise bis(cyclopentadienyl)zirconium dichloride, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium dichloride, bis(indenyl)zirconium dimethyl, bis(tetrahydro-1-indenyl)zirconium dichloride, bis(tetrahydro-1-indenyl)zirconium dimethyl, (n-propyl cyclopentadienyl, pentamethyl cyclopentadienyl) zirconium dichloride, dimethylsilylbis(tetrahydroindenyl) zirconium dichloride, dimethylsilylbis(tetrahydroindenyl) zirconium dimethyl, dimethylsilylbis(indenyl)zirconium dichloride, dimethylsilyl(bisindenyl)zirconium dimethyl, dimethylsilylbis(cyclopentadienyl)zirconium dichloride, dimethylsilylbis(cyclopentadienyl)zirconium dimethyl, or (n-propyl cyclopentadienyl, pentamethyl cyclopentadienyl) zirconium dimethyl.

In another class of embodiments, the metallocene catalyst may comprise bis(n-propyl cyclopentadienyl) hafnium dichloride, dimethyl, or dihydride; bis(n-butyl cyclopentadienyl) hafnium dichloride or dimethyl; bis(n-pentyl cyclopentadienyl) hafnium dichloride, or dimethyl; (n-propyl cyclopentadienyl)(n-butyl cyclopentadienyl) hafnium dichloride or dimethyl; bis[(2-trimethylsilyl-ethyl)cyclopentadienyl] hafnium dichloride or dimethyl; bis(trimethylsilyl cyclopentadienyl) hafnium dichloride, dimethyl, or dihydride; bis(2-n-propyl indenyl) hafnium dichloride or dimethyl; bis(2-n-butyl indenyl) hafnium dichloride or dimethyl; dimethylsilyl bis(n-propyl cyclopentadienyl) hafnium dichloride or dimethyl; dimethylsilyl bis(n-butyl cyclopentadienyl) hafnium dichloride or dimethyl; bis(9-n-propyl fluorenyl) hafnium dichloride or dimethyl; bis(9-n-butyl fluorenyl) hafnium dichloride or dimethyl; (9-n propyl fluorenyl)(2-n-propyl indenyl) hafnium dichloride or dimethyl; bis(1,2-n-propyl, methyl cyclopentadienyl) hafnium dichloride or dimethyl; (n-propyl cyclopentadienyl)(1,3-n-propyl, n-butyl cyclopentadienyl) hafnium dichloride or dimethyl; bis(n-propyl cyclopentadienyl) hafnium dimethyl; bis(n-butyl cyclopentadienyl) hafnium dimethyl; bis(n-pentyl cyclopentadienyl) hafnium dimethyl; (n-propyl cyclopentadienyl)(n-butyl cyclopentadienyl) hafnium dimethyl; bis[(2-trimethylsilyl-ethyl)cyclopentadienyl] hafnium dimethyl; bis(trimethylsilyl cyclopentadienyl) hafnium dimethyl; bis (2-n-propyl indenyl) hafnium dimethyl; bis(2-n-butyl indenyl) hafnium dimethyl; dimethylsilyl bis(n-propyl cyclopentadienyl) hafnium dimethyl; dimethylsilyl bis(n-butyl cyclopentadienyl) hafnium dimethyl; bis(9-n-propyl fluorenyl) hafnium dimethyl; bis(9-n-butyl fluorenyl) hafnium dimethyl; (9-n-propyl fluorenyl)(2-n-propyl indenyl) hafnium dimethyl; bis(1,2-n-propyl, methyl cyclopentadienyl) hafnium dimethyl; or (n-propyl cyclopentadienyl)(1,3-n-propyl, n-butyl cyclopentadienyl) hafnium dimethyl.

Suitable catalysts also include, for example, mono-Cp amido group 4 complexes, bridged fluorenyl-cyclopentadienyl group 4 complexes, and biphenyl phenol (BPP) transition metal complexes. Suitable mono-Cp amido group 4 complexes include compounds represented by the formula (V):

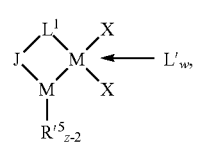

(V)

wherein: (1) M is a group 4 metal, preferably titanium; (2) $L^1$ is a divalent substituted or unsubstituted monocyclic or polycyclic arenyl ligand pi-bonded to M; (3) J is a divalent bridging group; (4) Z is a group 15 or 16 element with a coordination number of three if from group 15 or with a coordination number of two if from group 16 of the Periodic Table of Elements, and z is the coordination number of the element Z such that when Z is a group 16 element, z is 2 and $R^{l5}$ is absent; (5) $R^{l5}$ is a radical group which is a hydrocarbyl, substituted hydrocarbyl, halocarbyl, or substituted halocarbyl; (6) $L'_w$ is a neutral Lewis base and w represents the number of L' bonded to M where w is 0, 1, or 2, and, optionally, any L' and any X may be bonded to one another; and (7) each of the Xs are independently halogen radicals, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand. In any embodiment, both X may, independently, be a halogen, alkoxide, aryloxide, amide, phosphide or other univalent anionic ligand or both X can also be joined to form an anionic chelating ligand. Suitable $L^1$ monocyclic or polycyclic arenyl ligands include substituted and unsubstituted cyclopentadienyl, indenyl, fluorenyl, heterocyclopentadienyl, heterophenyl, heteropentalenyl, heterocyclopentapentalenyl, heteroindenyls, heterofluorenyl, heterocyclopentanaphthyls, heterocyclopentaindenyls, heterobenzocyclopentaindenyls, and the like.

In any embodiment, the mono-Cp amido group 4 complexes may include compounds represented by the formula (VI):

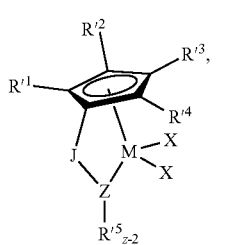

where: (1) J is a divalent bridging group, preferably comprising C, Si, or both; (2) M is a group 4 metal (for instance, Hf, Zr, or Ti, with Ti being preferred); (3) each X is independently a univalent anionic ligand, or two Xs are joined and bound to the metal atom to form a metallocycle ring, or two Xs are joined to form a chelating ligand, a diene ligand, or an alkylidene ligand; (4) each Rd, $R'^2$, $R'^3$, $R'^4$, and $R'^5$ is independently hydrogen, $C_1$-$C_{50}$ hydrocarbyl, substituted hydrocarbyl, halocarbyl, or substituted halocarbyl provided that any one or more of the pairs $R'_1$ and $R'^2$, $R'^2$ and $R'^3$, and $R'^3$ and $R'^4$, may, optionally, be bonded together to form a saturated or partially saturated cyclic or fused ring structure; and (5) Z is a group 15 or 16 element with a coordination number of three if from group 15 or with a coordination number of two if from group 16 of the Periodic Table of Elements, and z is the coordination number of the element Z. Preferably, Z is N, O, S, or P, preferably N, O, or P, preferably N. When Z is a group 16 element, z is 2 and $R'^5$ is absent.

In any embodiment, the bridging group, J, may be represented by $R*_2C$, $R*_2Si$, $R*_2CCR*_2$, $R*C=CR*$, $R*_2CSiR*_2$, or $R*_2SiSiR*_2$, where each $R*$ is, independently, hydrogen or a $C_1$ to $C_{20}$ containing hydrocarbyl or substituted hydrocarbyl, halocarbyl or substituted halocarbyl, and, optionally, two or more adjacent $R*$ may join to form a substituted or unsubstituted, saturated or partially unsaturated aromatic, cyclic, or polycyclic substituent. Alternatively, J is a bridging group comprising carbon and/or silicon atoms, such as dialkylsilyl, preferably J is selected from $CH_2$, $CH_2CH_2$, $C(CH_3)_2$, $SiMe_2$, $SiEt_2$, $SiPh_2$, $SiMePh$, $Ph_2C$, $(p-(Et)_3SiPh)_2C$, $Si(CH_2)_3$, $Si(CH_2)_4$, and $Si(CH_2)_5$. Alternatively, J may be any of the compounds described for "J" in the catalysts above.

In any embodiment, each X may be selected in accordance with the previously-described catalyst compounds. That is, each X may independently be selected from the group consisting of hydrocarbyl radicals having from 1 to 20 carbon atoms, halogens, hydrides, amides, alkoxides, sulfides, phosphides, halides, dienes, amines, phosphines, ethers, and a combination thereof. Two Xs may form a part of a fused ring or a ring system. Preferably, each X is independently selected from halides and $C_1$ to $C_5$ alkyl groups. For instance, each X may be a chloro, bromo, methyl, ethyl, propyl, butyl, or pentyl group. Often, each X is a methyl group.

In any embodiment, each $R'^1$, $R'^2$, $R'^3$, $R'^4$, and $R'^5$ may be independently selected from the following: H; $CH_3$; $CH_2CH_3$; $CH_2CH_2CH_3$; $CH_2$ $(CH_2)_2CH_3$; $CH_2$ $(CH_2)_{3\text{-}30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_{12}H_{23}$, $C_{10}H_{15}$, $C_6H_5$; $CH_2Si(CH_3)_3$; $CH_2CH=CH_2$; $CH_2CH_2CH=CH_2$; $CH_2CH_2$ $(CF_2)_7CF$; $CF_3$; $N(CH_3)_2$; $N(C_2H_5)_2$; and $OC(CH_3)_3$.

Preferably, each of $R'^1$, $R'^2$, $R'^3$, and $R'^4$ is independently $C_1$-$C_{10}$ alkyl or hydrogen. For instance, each of $R'^1$, $R'^2$, $R'^3$, and $R'^4$ may be methyl or hydrogen. Often, each of $R'^1$, $R'^2$, $R'^3$, and $R'^4$ is methyl, as is the case in dimethylsilylene (tetramethylcyclopentadienyl)(cyclododecylamido)titanium dimethyl. Alternatively, one of $R'^1$, $R'^2$, $R'^3$, and $R'^4$ is hydrogen, the remaining $R'^1$, $R'^2$, $R'^3$, and $R'^4$ are each methyl (as is the case in, e.g., dimethylsilylene(trimethylcyclopentadienyl)(cyclododecylamido)titanium dimethyl). Yet, alternatively, any of the pairs $R'^1$ and $R'^2$, $R'^2$ and $R'^3$, or $R'^3$ and $R'^4$ may be bonded together so as to form, together with the cyclopentadienyl moiety to which those pairs are attached, an indenyl, s-indacenyl, or as-indacenyl group (as is the case, for instance, with dimethylsilylene(6-methyl-1, 2,3,5-tetrahydro-s-indacen-5-yl)(tert-butylamido)titanium dimethyl). Yet, alternatively, Z is nitrogen, and $R'^5$ is selected from $C_1$-$C_{30}$ hydrocarbyl, substituted hydrocarbyl, halocarbyl, or substituted halocarbyl groups. Yet alternatively, Z is nitrogen, and $R'^5$ is a $C_1$ to $C_{12}$ hydrocarbyl group such as methyl, ethyl, propyl (n- or iso-), butyl (n-, iso-, sec-, or tert-), etc. For instance, $R'^5$ may be tert-butyl. Alternatively, $R'^5$, in certain embodiments, may be a cyclic group, e.g., adamantyl, cyclopropyl, cyclobutyl, cyclopentyl, cyclohexyl, cycloheptyl, cylcooctyl, cyclononyl, cyclodecyl, cylcododecyl, or norbornyl. Alternatively, $R'^5$, in certain embodiments, may an aromatic group, e.g., phenyl, tolyl, naphthyl, anthracenyl, etc. Often, $R'^5$ is t-butyl and/or cyclododecyl, and preferably Z is N.

As noted, other suitable catalyst compounds may be characterized as bridged fluorenyl-cyclopentadienyl group 4 complexes. Suitable compounds according to such embodiments include compounds represented by the formula (VII):

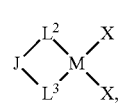

wherein: (1) M is a group 4 metal, preferably hafnium; (2) $L^2$ is a divalent substituted or unsubstituted fluorenyl, heterocyclopentapentalenyl, or heterofluorenyls ligand pi-bonded to M; (3) $L^3$ is a divalent cyclopentadienyl ring, a substituted cyclopentadienyl ring, a heterocyclopentadienyl ring, or a substituted heterocyclopentadienyl ligand pi-bonded to M; (4) J is a divalent bridging group; and (5) X are, independently, halogen radicals, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both Xs are joined and bound to the metal atom to form a metallacycle ring containing from about 3 to about 20 carbon atoms; or both together can be an olefin, diolefin, or aryne ligand. In any embodiment, both Xs may, independently, be a halogen, alkoxide, aryloxide, amide, phosphide, or other univalent anionic ligand; or both Xs can also be joined to form an anionic chelating ligand.

Suitable fluorenyl-cyclopentadienyl group 4 complexes include compounds represented by the formula (VIII):

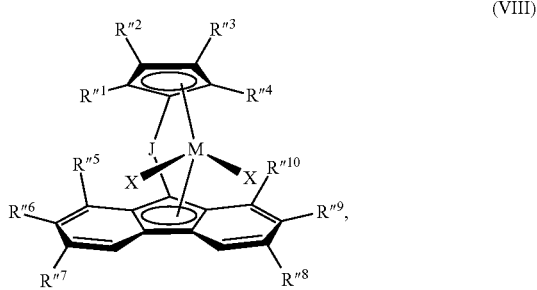

(VIII)

where: (1) J is a divalent bridging group preferably comprising C, Si, or both; (2) M is a group 4 metal (for instance, Hf, Zr, or Ti, with Hf being preferred); (3) each X is, independently, a univalent anionic ligand, or two Xs are joined and bound to the metal atom to form a metallocycle ring, or two Xs are joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is, independently hydrogen, $C_1$-$C_{50}$ hydrocarbyl, substituted hydrocarbyl, halocarbyl, or substituted halocarbyl, provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may, optionally, be bonded together to form a saturated or partially saturated cyclic or fused ring structure. In any embodiment, the bridging group, J, may be represented by $R^*_2C$, $R^*_2Si$, $R^*_2CCR^*_2$, $R^*C=CR^*$, $R^*_2CSiR^*_2$, or $R^*_2SiSiR^*_2$, where each R* is, independently, hydrogen or a $C_1$ to $C_{20}$ containing hydrocarbyl or substituted hydrocarbyl, and, optionally, two or more adjacent R* may join to form a substituted or unsubstituted, saturated or partially unsaturated or aromatic, cyclic, or polycyclic substituent. In any embodiment, J may be a bridging group comprising carbon and/or silicon atoms, such as dialkylsilyl; preferably J is selected from $CH_2$, $CH_2CH_2$, $C(CH_3)_2$, $SiMe_2$, $SiEt_2$, $SiPh_2$, $SiMePh$, $Ph_2C$, $(p-(Et)_3SiPh)_2C$, $Si(CH_2)_3$, $Si(CH_2)_4$, and $Si(CH_2)_5$. Alternately, J may be any of the compounds described for "J" in the catalysts above.

Each X may independently be selected from the group consisting of hydrocarbyl radicals having from 1 to 20 carbon atoms, halogens, hydrides, amides, alkoxides, sulfides, phosphides, halides, dienes, amines, phosphines, ethers, and a combination thereof. Two Xs may form a part of a fused ring or a ring system. Preferably, each X is independently selected from halides and $C_1$ to $C_5$ alkyl groups. For instance, each X may be a chloro, bromo, methyl, ethyl, propyl, butyl, or pentyl group. For example, each X is a methyl group.

In any embodiment, each $R'''^1$, $R'''^2$, $R'''^3$, $R'''^4$, $R'''^5$, $R'''^6$, $R'''^7$, $R'''^8$, $R'''^9$, and $R'''^{10}$ may be independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_6H_5$; $CH_2Si(CH_3)_3$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$. Often, any one or more of $R'''^1$, $R'''^2$, $R'''^3$, $R'''^4$, $R'''^5$, $R'''^6$, $R'''^7$, $R'''^8$, $R'''^9$, and $R'''^{10}$ may be hydrogen, methyl, ethyl, n-propyl, i-propyl, s-butyl, i-butyl, n-butyl, t-butyl, and so on for various isomers for $C_5$ to $C_{10}$ alkyls. Often, $R'''^6$ and $R'''^9$ may be t-butyl. For instance, $R'''^1$, $R'''^2$, $R'''^3$, $R'''^4$, $R'''^5$, $R'''^7$, $R'''^8$, and $R'''^{10}$ may each be independently selected from H, methyl, and ethyl. Often, each $R'''^1$-$R'''^{10}$ group other than $R'''^6$ and $R'''^9$ is H.

In any embodiment, the fluorenyl-cyclopentadienyl group 4 complexes may be represented by the formula (IX):

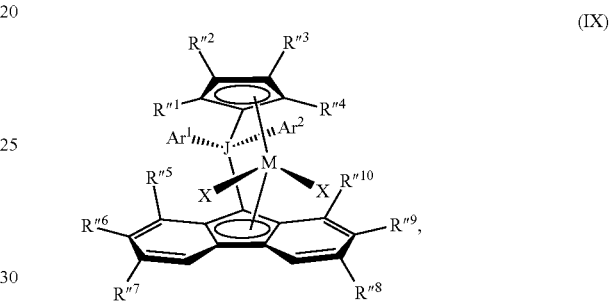

(IX)

wherein M, X, $R'''^1$-$R'''^{10}$ are defined as above, J' is a silicon or carbon atom, and $Ar^1$ and $Ar^2$ are independently $C_6$-$C_{30}$ aryl or substituted aryl groups, wherein the substituents, independently, each occurrence are selected from the group consisting of hydrocarbyl, substituted hydrocarbyl, halocarbyl, and substituted halocarbyl.

Often, at least one of the $Ar^1$ and $Ar^2$ contains at least one hydrocarbyl silyl substituent group having the formula $R^{*'}_nSiR''_3$, where each R'' is independently a $C_1$-$C_{20}$ hydrocarbyl, substituted hydrocarbyl, halocarbyl, substituted halocarbyl, silylcarbyl, or substituted silylcarbyl substituent, $R^{*'}$ is a $C_1$-$C_{10}$ substituted or unsubstituted alkyl, alkenyl, and/or alkynyl linking group between Si and the aryl group, and n=0 or 1. For example, when n is 0, one or both of $Ar^1$ and $Ar^2$ may be trimethylsilylphenyl ($Me_3SiPh$), triethylsilylphenyl ($Et_3SiPh$), tripropylsilylphenyl ($Pr_3SiPh$), etc. Similarly, when n is 1, $R^{*'}$ is present as a linking group, for example a $C_2$ linking group (e.g., ethyl linking group), then one or both of $Ar^1$ and $Ar^2$ may be (trimethylsilyl)ethyl phenyl ($Me_3SiCH_2CH_2Ph$), and so on. Thus, for example, wherein (1) $R'''^6$ and $R'''^9$ are each t-butyl as discussed above; (2) $R'''^1$-$R'''^4$, $R'''^5$, $R'''^7$, $R'''^8$, and $R'''^{10}$ are each H, as also discussed above; (3) $Ar^1$ and $Ar^2$ are each $Et_3SiPh$; (4) J is C; (5) M is Hf; and (6) each X is methyl, an exemplary catalyst accordingly can be given as 1,1'-bis(4-triethylsilylphenyl)methylene-(cyclopentadienyl)(2,7-di-tert-butyl-fluoren-9-yl)hafnium dimethyl.

Biphenyl Phenol Catalysts (BPP)

The at least one olefin polymerization catalyst may also comprise one or more biphenyl phenol catalysts (BPP) or also known as biphenyl phenol transition metal catalysts, for example, at least one olefin polymerization catalyst (b) or (c), or wherein the at least one olefin polymerization catalyst (b) is not a metallocene catalyst. Such catalysts and their use in polymerization processes have been described in, for example, U.S. Publication Nos. 2009/0306323; 2006/0025548; 2006/020588; 2006/00211892; and U.S. Pat. Nos. 7,091,282; 7,030,256; 7,060,848; 7,126,031; 6,841,502; and 8,586,497; and PCT Publication Nos. WO 2006/020624; WO 2005/108406; WO 2003/091262; and WO 2016/094861.

The BPP catalyst may comprises a pyridyldiamido transition metal complex represented by the formula (X):

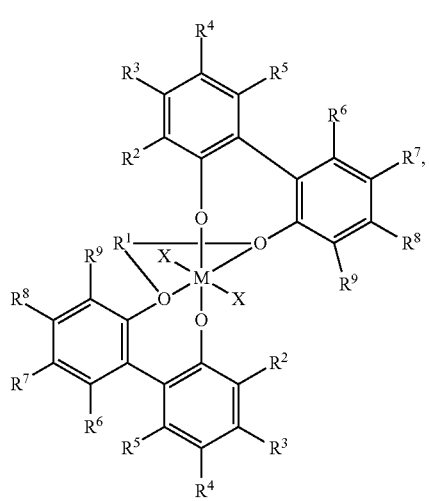

(X)

wherein M may be Ti, Zr, or Hf M may be selected from the group consisting of Ti, Zr, and Hf; each $R^1$ through $R^9$ may be independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; wherein X is at least one leaving group.

In any embodiment described herein, M is selected from the group consisting of Ti, Zr, and Hf $R^2$ is, optionally, selected from the group consisting of alkyls, aryls, and heteroaryls; each $R^4$ is selected from the group consisting of H, alkyls, and aryls. X is selected from the group consisting of F, Cl, Br, I, Me, benzonitrile (Bnz), $CH_2SiMe_3$, and $C_1$ to $C_5$ alkyls or alkenyls.

In any embodiment described herein, $R^1$ may be selected from the group consisting of $CH_2CH_2$, $(CH_2)_3$, $(CH_2)_4$, $CH_2CHMeCH_2$, $CH_2CMe_2CH_2$, $Me_2Si$, $CH_2SiMe_2CH_2$, and $CH_2SiR_2CH_2$; each $R^2$ may be any aryl group with substituents in the 2 and 6 positions; each $R^3$ and $R^5$ through $R^9$ are H; each $R^4$ is selected from the group consisting of H, methyl, ethyl, propyl, butyl, and pentyl; and X is selected from the group consisting of F, Cl, Br, I, Me, Bnz, $CH_2SiMe_3$, and $C_1$ to $C_5$ alkyls or alkenyls.

Additionally, or alternatively, M is either Zr or Hf; each $R^1$ is either $(CH_2)_3$ or $(CH_2)_4$; each $R^2$ is selected from the group consisting of 2,6-$Me_2Ph$, 2,6-$Et_2Ph$, 2,6-Pre-Ph, 2,6-$Bu_2Ph$, 2-MeNapthyl, 2,4,6-$Me_3Ph$, 2,4,6-$Et_3Ph$, 2,4,6-$Pr_3Ph$, and carbazole; each $R^4$ is selected from the group consisting of H, methyl and butyl; and X is selected from the group consisting of F, Cl, and Me.

Additionally, or alternatively, $R^1$ is $(CH_2)_3$; each $R^2$ is either 2,4,6-$Me_3Ph$ or 2-MeNapthyl; each $R^4$ is $CH_3$; X is Cl; and M is Zr.

In one embodiment, the phenoxide transition metal catalyst is a biphenyl phenol catalyst represented by the formula (XI):

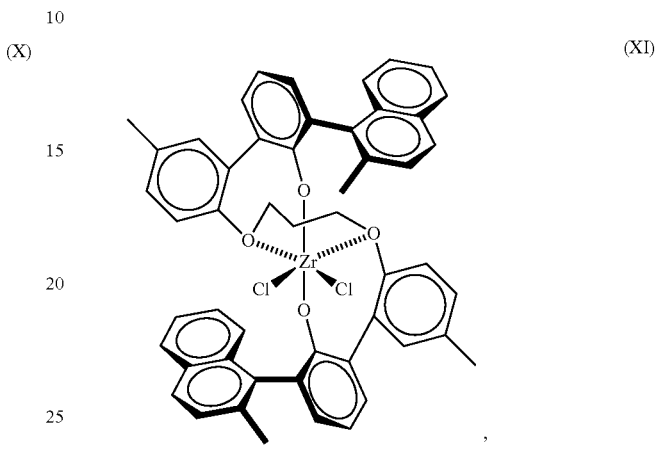

(XI)

In another embodiment, the phenoxide transition metal catalyst is a biphenyl phenol catalyst represented by the formula (XIIa):

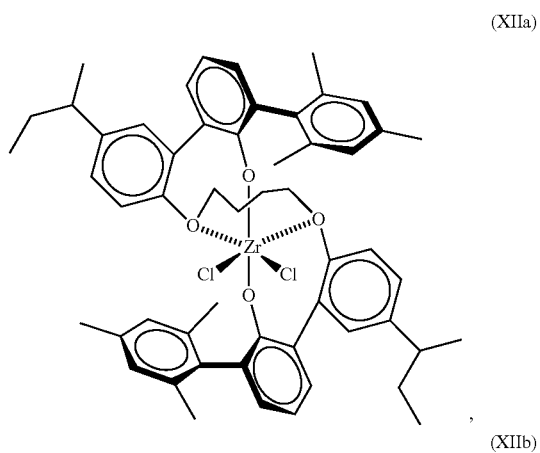

(XIIa)

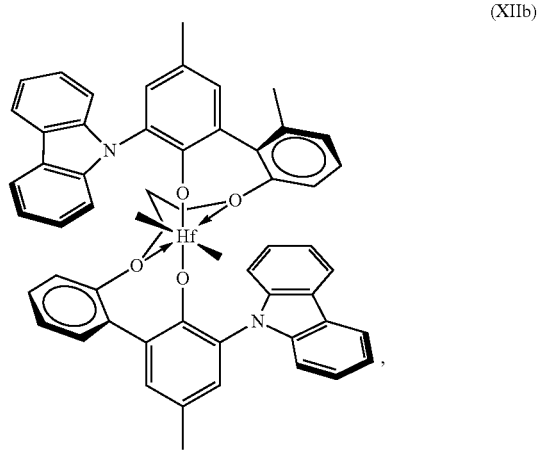

(XIIb)

Activators/Co-Catalyst

The catalyst system may comprise one or more activators or, alternatively, the catalyst(s) may be contacted with one or more activators. Non-limiting limiting examples include alumoxanes, aluminum alkyls, ionizing activators, which may be neutral or ionic, and conventional-type co-catalysts. Particular co-activators include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane activators may be utilized as an activator for an olefin polymerization catalyst. Alumoxanes are generally oligomeric compounds containing —Al(R')—O— subunits, where $R^1$ is an alkyl group. Examples of alumoxanes include methylalumoxane (MAO), modified methylalumoxane (MMAO), ethylalumoxane, isobutylalumoxane, and mixtures thereof. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, see, also, U.S. Pat. No. 5,041,584).

When the co-activator is an alumoxane (modified or unmodified), the maximum amount of co-activator is generally a 5000-fold molar excess Al/M over the catalyst compound (per metal catalytic site). The minimum alumoxane-to-catalyst-compound is a 1:1 molar ratio. Other ranges may include from 1:1 to 1000:1, such as 1:1 to 500:1. For instance, alumoxane may be employed at any one of about 500, 450, 400, 350, 300, 250, 200, 150, 100, 50, 25, and 1 mole(s) or less, per mole catalyst compound.

In addition or instead, catalyst systems may include at least one non-coordinating anion (NCA) co-activator. Non-coordinating anions useful in accordance with this invention are those that are compatible, stabilize the transition metal cation in the sense of balancing its ionic charge at +1, and yet retain sufficient ability to permit displacement during polymerization.

Preferred boron containing NCA activators are represented by the formula below:

$$Z_d^+(A^{d-}),$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3. The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums, and mixtures, preferably carboniums and ferroceniums. Often, $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenyl carbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethyl amine, diethyl amine, N-methylaniline, diphenylamine, trim ethylamine, triethylamine, N,N-dimethylaniline, methyl diphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A_d^-$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halo substituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A_d^-$ also include diboron compounds as disclosed in U.S. Pat. No. 5,447,895. Illustrative, but not limiting, examples of boron compounds which may be used as an activating cocatalyst are the compounds described as (and particularly those specifically listed as) activators in U.S. Pat. No. 8,658,556.

Non-limiting examples include N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate. See U.S. Pat. No. 8,658,556.

Other non-limiting examples include N,N-dimethylaninlium tetrakis(pentafluorophenyl)borate; N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, $[Ph_3C^+][B(C_6F_5)_4^-]$, $[Me_3NH^+][B(C_6F_5)_4^-]$; $1$-(4-(tris(pentafluorophenyl)borate)-2,3,5,6-tetrafluorophenyl)pyrrolidinium; tetrakis (pentafluorophenyl)borate, 4-(tris(pentafluorophenyl) borate)-2,3,5,6-tetrafluoropyridine, bis($C_4$-$C_{20}$ alkyl) methylammonium tetrakis(pentafluorophenyl)borate and bis (hydrogenated tallow alkyl)methylammonium tetrakis (pentafluorophenyl)borate. See, also, U.S. Pat. No. 6,211, 105. Any of the activators described herein may optionally be mixed together before or after combination with the catalyst(s).

Further, the typical NCA-to-catalyst ratio for each of the catalysts (e.g., all NCA-to-catalyst or all NCAs-to-catalysts ratio) is a 1:1 molar ratio. Alternative preferred ranges include from 0.1:1 to 100:1. For instance, NCA-to-catalyst ratio may be any one of about 0.5, 1, 2, 5, 10, 50, 75, 100, 200, 250, 300, 350, 400, 450, 500, 600, 700, 800, 900, and 1000 to 1. Often, the NCA-to-catalyst ratio may be within a range between any two of the foregoing. It is also within the scope of this invention that either or both of the mono-Cp amido group 4 complexes, bridged fluorenyl-cyclopentadienyl group 4 complexes, biphenyl phenol (BPP) transition metal complexes, pyridyl amide transition metal complexes and/or pyridyl diamide transition metal complexes and other catalyst compounds can be combined with combinations of alumoxanes and NCAs.

Often, the activator(s) is/are contacted with a catalyst(s) to form the catalyst system comprising activated catalyst(s) and activator or other charge-balancing moiety, before the catalyst system is contacted with one or more monomers. Alternatively, the activator(s) may be co-fed to catalyst(s) together with one or more monomers. Where two or more catalysts are utilized (i.e., a mixed catalyst system or dual catalyst system), each of the catalyst compounds may be contacted with their respective activator(s) (which, again, may be the same or different) before being mixed together. Where the same activator is used for each, a mixture of catalyst(s) may be contacted with activator (either before or along with feeding of monomers to the catalyst mixture).

Supports

The catalyst system may comprise at least one support or the catalyst and activator, in any order, may be contacted with at least one support. The catalyst system may optionally be supported. The terms "support" or "carrier" are used interchangeably herein and refer to any support material, including inorganic or organic support materials. The term "supported" as used herein refers to one or more compounds that are deposited on, contacted with, vaporized with, bonded to, or incorporated within, adsorbed or absorbed in, or on, a support or carrier. In some embodiments, the support material can be a porous or semi-porous support material. In other embodiments, the support material can be a non-porous support material.

Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or cross-linked organic supports such as polystyrene divinyl benzene polyolefins or polymeric compounds, and mixtures thereof, and graphite, in any of its various forms. Non-limiting examples of inorganic support materials include inorganic oxides and inorganic chlorides.

Commercial supports include the ES70 and ES757 family of silicas available from PQ Corporation, Malvern, Pa. Other commercial supports include Sylopol™ Silica Supports including 955 silica and 2408 silica available from Grace Catalyst Technologies, Columbia, Md.

Examples of supporting a catalyst system are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,468,702; and 6,090,740; and PCT Publications WO 95/32995; WO 95/14044; WO 96/06187; and WO 97/02297.

The support may also be a silicate support. See, for example, WO 2016/094861. The silicate support may be an ion exchanged layered silicate support. Ion-exchange layered silicate useful in the present invention are silicate compounds having crystal structures wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. Preferably, the ion-exchange layered silicate is acidified by contacting with an acid (such as sulfuric acid, hydrochloric acid, a carboxylic acid, an amino acid, or the like.)

Preferred ion-exchange layered silicates useful in this invention include those having a 1:1 type structure or a 2:1 type structure. Examples of the ion-exchange layered silicate include layered silicates having a 1:1 type structure or a 2:1 type structure as described in "Clay Mineralogy" written by R. E. Grim (published by McGraw Hill in 1968) and "Chemistry of Clays and Clay Minerals" written by A. C. Newman (published by John Wiley and Sons: New York in 1987). The 1:1 type structure is a structure formed by laminating 1:1 layered structures having one layer of tetrahedral sheet and one layer of octahedral sheet combined as described in the above literature "Clay Mineralogy," and the 2:1 type structure is a structure formed by laminating 2:1 layered structures having one layer of octahedral sheet sandwiched between two layers of tetrahedral sheets. Examples of ion exchange layered silicate comprising the 1:1 layer as the main constituting layer include kaolin group silicates such as dickite, nacrite, kaolinite, meta-halloysite, halloysite, or the like, and serpentine group silicates such as chrysotile, lizardite, antigorite, or the like. Examples of ion-exchange layered silicate comprising the 2:1 layer as the main constituting layer include smectite group silicates such as montmorillonite, beidellite, nontronite, saponite, hectorite, stephensite, or the like, vermiculite group silicates such as vermiculite, or the like, mica group silicates such as mica, illite, sericite, glauconite, or the like, and attapulgite, sepiolite, palygorskite, bentonite, pyrophyllite, talc, chlorites, and the like. Mixed layer silicates are also included. Often, an ion-exchange layered silicate having the 2:1 type structure is preferable. Preferably, a smectite group silicate is used and in a particularly preferable example the ion exchange layered silicate comprises montmorillonite.

Polymerization Processes and Olefin Monomers

The catalysts, catalyst system components, and catalyst systems described above are suitable for polymerization processes for the production of polyolefin polymers over a wide range of temperatures and pressures. Polymerization processes include solution, gas phase, slurry phase, super critical, a high pressure process, or a combination thereof, for example the same or different reactors in series or parallel.

A particularly preferred process is a gas phase or slurry phase polymerization process for the production of ethylene-based polymers and propylene-based polymers. For the sake of brevity and illustration purposes only, embodiments of the present invention will be further described below with an emphasis to the polymerization of ethylene monomer to make polyethylene polymers using a gas phase, fluidized bed polymerization process. However, in no way shall this be limiting to the scope of the claims unless affirmatively recited therein.

In any embodiment, the process of the invention may be directed toward a solution, high pressure, slurry or gas phase polymerization process of one or more olefin monomers having from 2 to 30 carbon atoms, preferably 2 to 12 carbon atoms, and more preferably 2 to 8 carbon atoms. In a class of embodiments, the polymerization of two or more olefin monomers of ethylene, propylene, butene-1, pentene-1,4-methyl-pentene-1, hexene-1, octene-1 and decene-1 is preferred.

Other monomers include ethylenically unsaturated monomers, diolefins having 4 to 18 carbon atoms, conjugated or nonconjugated dienes, polyenes, vinyl monomers, cyclic olefins, and combinations thereof. Non-limiting examples of monomers useful include norbornene, 5-vinyl-2-norbornene, norbornadiene, isobutylene, isoprene, vinylbenzocyclobutane, styrenes, alkyl substituted styrene, ethylidene norbornene, dicyclopentadiene and cyclopentene.

Alternatively, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. Yet alternatively, ethylene or propylene is polymerized with at least two different comonomers, optionally one of which may be a diene, to form a terpolymer.

The catalyst system may be employed in liquid phase (solution, slurry, suspension, bulk phase, or combinations thereof), in high pressure liquid, supercritical fluid, or gas phase processes. Each of these processes may be employed in single, parallel, or series reactors. The liquid processes comprise contacting the ethylene and/or alpha-olefin and at least one vicinally disubstituted olefin monomer with the catalyst system described herein in a suitable diluent or solvent and allowing the monomers to react for a sufficient time to produce copolymers. One or more of the monomers used in the polymerization may be utilized as a solvent and/or diluent, generally in homogeneous polymerizations in the liquid monomer or monomers. Hydrocarbon solvents are also suitable, both aliphatic and aromatic, including hexane and toluene. Bulk and slurry processes may typically be accomplished by contacting the catalysts with a slurry of liquid monomer, the catalyst system being supported.

Gas phase processes may use the supported catalyst and may be conducted in any manner known to be suitable for producing ethylene homopolymers or copolymers via coordination polymerization.

Generally, the polymerization reaction temperature may vary from −50° C. to 250° C. The reaction temperature conditions may be from −20° C. to 220° C., or below 200° C. The pressure may vary from 1 mm Hg to 2500 bar, or from 0.1 bar to 1600 bar, or from 1.0 to 500 bar. Where lower molecular weight copolymers, e.g., $M_n \leq 10,000$, are sought, it may be suitable to conduct the reaction processes at temperatures above 0° C. and pressures under 500 bar.

The gas phase process can be operated in a condensed mode, where an inert or induced condensable/condensing agent/fluid is introduced to the process to increase the cooling capacity of the reactor system. These inert condensable fluids are referred to as induced condensing agents or ICA's. Condensed mode processes are further described in U.S. Pat. Nos. 5,342,749 and 5,436,304.

Additional polymerization process and related equipment details are more fully described in, for example, U.S. Pat. Nos. 4,543,399; 4,588,790; 5,028,670; 5,317,036; 5,352,749; 5,382,638; 5,405,922; 5,436,304; 5,453,471; 5,462,999; 5,616,661; 5,627,242; 5,665,818; 5,668,228; 5,677,375; 5,804,678; 6,362,290; and 6,689,847.

Polymer Products

The polymers produced by the process of the invention can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene and polypropylene copolymers. The term "polyethylene" or "polyethylene polymer" refers to a polymer having at least 50 wt % ethylene-derived units, at least 70 wt % ethylene-derived units, at least 80 wt % ethylene-derived units, or 90 wt % ethylene-derived units, or 95 wt % ethylene-derived units, or 100 wt % ethylene-derived units.

Polyolefin polymers, for example, polyethylene polymers, may have a density of from 0.860 g/cm$^3$ to 0.970 g/cm$^3$. In several embodiments, the density may be about ≥0.890 g/cm$^3$, about ≥0.900 g/cm$^3$, about ≥0.912 g/cm$^3$, about ≥0.915 g/cm$^3$, about ≥0.918 g/cm$^3$, about ≥0.920 g/cm$^3$, e.g., about ≥0.922 g/cm$^3$, about ≥0.928 g/cm$^3$, about ≥0.930 g/cm$^3$, about ≥0.932 g/cm$^3$ and the density may be about ≤0.945 g/cm$^3$, e.g., about ≤0.940 g/cm$^3$, about ≤0.937 g/cm$^3$, about ≤0.935 g/cm$^3$, about ≤0.933 g/cm$^3$, about ≤0.930 g/cm$^3$, or about ≤0.925 g/cm$^3$. Ranges expressly disclosed include, but are not limited to, ranges formed by combinations any of the above-enumerated values, e.g., about 0.900 to about 0.940 g/cm$^3$, about 0.912 to about 0.930 g/cm$^3$, about 0.915 to about 0.925 g/cm$^3$, about 0.920 to about 0.940 g/cm$^3$, etc. Density is determined using chips cut from plaques compression molded in accordance with ASTM D-1928 Procedure C, aged in accordance with ASTM D-618 Procedure A, and measured as specified by ASTM D-1505.

Mn is number average molecular weight, Mw is weight average molecular weight, and Mz is z average molecular weight. Molecular weight distribution (MWD) is defined to be Mw divided by Mn. Unless otherwise noted, methods for determining such measurements are provided below and all molecular weight units (e.g., Mw, Mn, Mz) are g/mol.

Polyethylene polymers may have a weight average molecular weight (Mw) of from 20,000 up to 2,000,000 g/mol, 50,000 to 1,500,000 g/mol, 50,000 to 250,000 g/mol, 80,000 g/mol to 150,000 g/mol, 100,000 to 1,300,000 g/mol, 300,000 to 1,300,000 g/mol, or 500,000 to 1,300,000 g/mol.

Propylene based polymers produced include isotactic polypropylene, atactic polypropylene, and random, block, or impact copolymers. Preferred propylene polymer, preferably homopolymer, produced herein has an Mw of 20,000 up to 2,000,000 g/mol.

Polyolefin polymers, for example, polyethylene polymers, may have a melt index, 12.16, or 12 as a "shorthand," according to ASTM D-1238 (190° C./2.16 kg), of about ≥0.05 g/10 min, about ≥0.10 g/10 min, about ≥0.15 g/10 min, about ≥0.18 g/10 min, about ≥0.20 g/10 min, about ≥0.22 g/10 min, about ≥0.25 g/10 min, about ≥0.28 g/10 min, about ≥0.30 g/10 min, about ≥0.35 g/10 min, about ≥0.40 g/10 min, about ≥0.50 g/10 min and a melt index (12.16) about ≤10.00 g/10 min, about ≤7.00 g/10 min, about ≤5.00 g/10 min, about ≤3.00 g/10 min, about ≤2.00 g/10 min, about ≤1.00 g/10 min, about ≤0.70 g/10 min, about ≤0.50 g/10 min, about ≤0.40 g/10 min, or about ≤0.30 g/10 min. Ranges expressly disclosed include, but are not limited to, ranges formed by combinations any of the above-enumerated values, e.g., about 0.05 to about 10.00 g/10 min, about 0.10 to about 7.00 g/10 min, about 0.18 to about 0.22 g/10 min, about 0.50 to about 5.00 g/10 min, etc.

Preparation of Blends

The polyolefin polymers be blended and/or coextruded with any other polymers and/or or materials. Non-limiting examples of other polymers include linear low density polyethylenes, elastomers, plastomers, high pressure low density polyethylene, high density polyethylenes, isotactic polypropylene, ethylene/propylene copolymers, propylene-based polymers and propylene-base elastomers, and the like.

The polymer blend can be formed using conventional equipment and methods, such as by dry blending the individual components and subsequently melt mixing in a mixer or by mixing the components together directly in a mixer, such as, for example, a Banbury mixer, a Haake mixer, a Brabender internal mixer, or a single or twin-screw extruder, which can include a compounding extruder and a side-arm extruder. In an embodiment, the mixing comprises mixing the polyolefin polymer composition with an extruder and/or mixer.

In another embodiment, the polymer blend can be produced in situ using a multistage polymerization reactor arrangement and process. In a multistage reactor arrangement two or more reactors, the same or different, can be connected in series where a mixture of a first polymer component derived from one catalyst system can be transferred from a first reactor to a second reactor where a second polymer component derived another catalyst system or the same catalyst system of the first reactor but under different polymerization conditions can be produced and blended in situ with the first polymer component to produce a polyolefin polymer composition. A multi-stage polymerization reactor and methods for using the same is described, for example, in U.S. Pat. No. 5,677,375. Thus, in this embodiment, the mixing comprises mixing the polyolefin polymer composition in situ in a reactor, and, optionally, the mixing comprises mixing the polyolefin polymer composition in a series of reactors.

The polyolefin polymer composition may include at least 0.1 percent by weight (wt %) and up to 99.9 wt % of the first polymer composition and at least 0.1 wt % and up to 99.9 wt % of the second polymer composition, based on the total weight of the polyolefin polymer composition. The amount of the second polymer composition in the polyolefin polymer composition may range from a low of about 5 wt %, about 10 wt %, about 20 wt %, about 30 wt %, or about 40 wt % to a high of about 60 wt %, about 70 wt %, about 80 wt %, about 90 wt %, or about 95 wt %, based on the total weight of the polyolefin polymer composition. In a class of embodiments, the amount of the second polymer composition in the polyolefin polymer composition may range from about 15 wt % to about 40 wt %, about 10 wt % to about 35 wt %, or about 20 wt % to about 45 wt %, based on the total weight of the polyolefin polymer composition. In another class of embodiments, the amount of the second polymer composition in the polyolefin polymer composition may be at least 5 wt %, at least 10 wt %, at least 15 wt %, at least 20 wt %, at least 25 wt %, at least 30 wt %, or at least 35 wt % and less than about 50 wt %, based on the total weight of the polyolefin polymer composition. In an embodiment, the polyolefin polymer composition may include from about 20 wt % to about 35 wt % of the second polymer composition and from about 65 wt % to about 80 wt % of the first polymer composition, based on the total weight of the polyolefin polymer composition.

End-Use Applications

The polyolefin polymer composition may be used for any number of end-use applications. The polyolefin polymer composition can be used alone or in combination with one or more other polymers or materials, blends of polymers, and the like, to produce a variety of end-use articles. Such end-uses articles include, without limitation, films (e.g., blown and cast, optionally, oriented MD and/or TD), film-based products, film cells, film membranes, wrap films, diaper components, diaper backsheets, housewrap, personal care containers, pouches, stand-up pouches, liners, geo membranes, greenhouse films, bags, packaging, wire and cable coating compositions, articles formed by molding techniques, e.g., injection or blow molding, extrusion coating, foaming, casting, and combinations thereof. Exemplary end uses can include, but are not limited to, films, film-based products, diaper backsheets, housewrap, wire and cable coating compositions, articles formed by molding techniques, e.g., injection or blow molding, extrusion coating, foaming, casting, and combinations thereof. End-use articles can also include products made from films, e.g., bags, packaging, and personal care films, pouches, medical products, such as for example, medical films and intravenous (IV) bags. For end uses that include films, either or both of the surfaces of the films can be modified by known and conventional post-forming techniques such as corona discharge, chemical treatment, flame treatment, metallization, and the like.

Specific end use films can include, for example, stretch films. Illustrative stretch films or stretch-type films can include, but are not limited to, stretch cling films, stretch handwrap films, and machine stretch films. Other types of films can include, but are not limited to, high stock films, shrink films, shrink wrap films, green house films, laminates, and laminate films. The films can be prepared by any conventional technique known to those skilled in the art, such as for example, techniques utilized to prepare blown, extruded, and/or cast stretch and/or shrink films (including shrink-on-shrink applications). The term "stretch film" refers to films capable of stretching and applying a bundling force and includes films stretched at the time of application as well as "pre-stretched" films, i.e., films which are provided in a pre-stretched form for use without additional stretching. The films can be monolayer films or multilayer films.

Test Methods $^1$H NMR $^1$H NMR spectroscopic studies were performed using a Bruker 400 or 500 MHz NMR. Data was collected using samples prepared by dissolving 10-20 mg the compound in 1 mL of $C_6D_6$. Samples were then loaded into 5 mm NMR tubes for data collection. The chemical shifts (δ) presented are relative to the residual protium in the deuterated solvent at 7.15 ppm.

Gel Permeation Chromatography with Three Detectors (GPC-3D)

Mw, Mn, and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R.

Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_0 c}{\Delta R(\theta)} = \frac{1}{MP(\theta)} + 2A_2 c,$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_0 = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2,$$

where c is concentration and was determined from the DRI output.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001 volume 34(19), pages 6812-6820).

All molecular weights are weight average unless otherwise noted. All molecular weights are reported in g/mol unless otherwise noted.

Comonomer content such as hexene wt % is obtained by ¹H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index or $I_{21}/I_2$.

Examples

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

A first polyolefin composition was polymerized using a dual catalyst system including a metallocene catalyst and a biphenyl phenol catalyst co-supported on silica and activated with MAO in accordance with the methods and equipment used to prepare the inventive examples disclosed in U.S. Pat. No. 8,586,497. A second polyolefin composition was also polymerized using a catalyst system using a single metallocene catalyst supported on silica and activated with MAO using the same methods and equipment used for the production of the first polyolefin composition. Specific process details and properties may be found in Table 1. The metallocene catalyst was bis(n-propyl cyclopentadienyl) hafnium dichloride (Catalyst A) (VP). The biphenyl phenol catalyst was of the following structure:

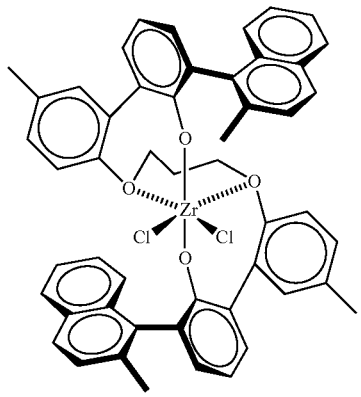

(Catalyst B) (UNIV08)

TABLE 1

|  | Run Part No. | | | |
| --- | --- | --- | --- | --- |
|  | 1 | 3 | 13 | 5 |
|  | Part Description | | | |
|  | VP-100 Control | VP-100 + 2.5 m % UNIV08 | VP-100 + 3.5 m % UNIV08 | VP-100 + 5 m % UNIV08 |
| Catalyst Cylinder or Batch ID | 2652-M | 1760-50 | 1760-52 | 1760-48 |
| REACTION CONDITIONS | | | | |
| Prod Rate (lbs/hr) | 39.93 | 42.70 | 47.29 | 46.53 |
| STY (lb/hr/ft^3) | 5.6447 | 6.3727 | 6.9681 | 6.7923 |
| Residence Time (hrs) | 2.80 | 2.65 | 2.36 | 2.51 |
| C2 Partial Pressure (psia) | 219.96 | 220.03 | 212.45 | 219.97 |
| H2/C2 Conc Ratio (ppm/m %) | 4.79 | 6.43 | 6.57 | 9.34 |
| C6/C2 Conc Ratio (m/m) | 0.0160 | 0.0132 | 0.0127 | 0.0117 |
| Isopentane (mole %) | 3.37 | 2.90 | 2.77 | 2.88 |
| Rxn Temperature (°) | 79.00 | 79.00 | 79.01 | 79.00 |
| Fluid Bulk Density (lb/ft3) | 15.87 | 17.01 | 16.08 | 17.14 |
| Continuity Additive Conc (ppmw prod) | 29.1 | 26.4 | 20.6 | 28.7 |
| PRODUCT PROPERTIES | | | | |
| Melt Index (dg/min) | 0.936 | 1.031 | 0.907 | 0.882 |
| MI-5 (dg/min) | 2.780 | 3.522 | 3.226 | 3.644 |
| High Load Melt Index (dg/min) | 27.467 | 37.572 | 35.516 | 48.493 |
| MFR (HLMI/MI) | 29.4 | 36.4 | 39.2 | 55.0 |
| MFR I21/I5 | 9.9 | 10.7 | 11.0 | 13.3 |
| Density (g/cc) | 0.9186 | 0.9181 | 0.9185 | 0.9179 |
| Screen APS (in) | 0.272 | 0.0307 | 0.0297 | 0.0329 |
| Screen + No 10 (wt %) | 0.28 | 0.89 | 0.56 | 0.28 |
| Screen Fines L T No 120 (wt %) | 0.11 | 0.25 | 0.19 | 0.27 |
| CATALYST PRODUCTIVITY | | | | |
| Cat Prod (matl Bal) | 10008 | 10497 | 11019 | 18390 |
| Cat Prod (Al XRF) | 5448 | 10404 | 7815 | 10666 |
| Cat Prod (Hf XRF) | 11184 | 19378 | 22828 | 60000 |

In a first study, polyethylene compositions were made from the first polyolefin composition (Catalyst A+5 mol % Catalyst B) (BCT145629) and the second polyolefin composition (Catalyst A) (BCT146530) using extruder mixing. Polyethylene compositions were produced in the following ratios with Irganox™ 1076 antioxidant and Irgafos™ 168 antioxidant (both from BASF Corp., Florham Park, N.J.): 100/0, 75/25, 50/50, 25/75, and 0/100 of the first polyethylene composition and the second polyethylene composition as shown in Table 2. A miniature twin screw extruder (fully configurable 40 L/D co-rotating screws) utilizing the Thermo Scientific Process 11 was employed. In particular, a multiple-pass (e.g., two passes) extrusion process using a "restrictive" screw configuration was employed. The extruder temperature was set as follows: 170° C./175° C./180° C./185° C./185° C./190° C./193° C./198° C., at 200 rpm with a 15% feed rate. 140 g batch was prepared, extruded, and pelletized, in the first pass. In the second pass, about half of the pellets were re-extruded, passing about 70 g for each of the two passes. The polyethylene compositions and their properties are shown below in Table 2. As can be seen in Table 2 and FIG. 1, the polyethylene compositions made from the first polyolefin composition and the second polyolefin composition have higher melt strengths than either of its individual components.

TABLE 2

| | | First Pass | | | | |
|---|---|---|---|---|---|---|
| | | Description | | | | |
| | | 100% BCT145629 (VP + 5%UNIV08) | 75% BCT145629 25% BCT146530 | 50% BCT145629 50% BCT146530 | 25% BCT145629 75% BCT146530 | 100% BCT146530 (VP/G5 Control) |
| Description | | 1st Pass 100% BCT145629 (VP + 5% UNIV08) UT00454-091-010 100% BCT145629 (VP + 5% UNIV08) | 1st Pass 75% BCT145629 25% BCT146530 UT00454-091-020 75% BCT145629 25% BCT146530 | 1st Pass 50% BCT145629 50% BCT146530 UT00454-091-030 50% BCT145629 50% BCT146530 | 1st Pass 25% BCT145629 75% BCT146530 UT00454-091-040 25% BCT145629 75% BCT146530 | 1st Pass 100% BCT146530 (VP/G5 Control) UT00454-091-050 100% BCT146530 (VP/G5 Control) |
| Description | | | | | | |
| S131121: Small NGMCN/UHMW Blends | | BCT-158562 | BCT-158563 | BCT-158564 | BCT-158565 | BCT-158566 |
| MKD - # | | 340114-A1 | 340114-A2 | 340114-A3 | 340114-A4 | 340114-A5 |
| CTL- NB# | | UT00454-091-010 | UT00454-091-020 | UT00454-091-030 | UT00454-091-040 | UT00454-091-050 |
| TSP - FP# | | 782241 | 782242 | 782243 | 782244 | 782245 |
| BCT-145629 | (g) | 70 | 52.5 | 35 | 17.5 | 0 |
| BCT-146530 | (g) | 0 | 17.5 | 35 | 52.5 | 70 |
| Irganox 1076 | (g) | 0.021 | 0.021 | 0.021 | 0.021 | 0.021 |
| Irgafos 168 | (g) | 0.098 | 0.098 | 0.098 | 0.098 | 0.098 |
| wt % of (VP + 5% UNIV08) added to VP/G5-Control | (%) | 1 | 0.75 | 0.5 | 0.25 | 0 |
| Extrusion Pass | | 1 | 1 | 1 | 1 | 1 |
| DSR @ 190° C. | | BCT-158562 | BCT-158563 | BCT-158564 | BCT-158565 | BCT-158566 |
| A1 (Pa · s) | (Pa · s) | 123534.8848 | 47392.03694 | 21217.15473 | 13730.29276 | 9539.676846 |
| A2 (sec) | (sec) | 147.6034182 | 18.38079322 | 1.995412672 | 0.493729714 | 0.140633278 |
| A3 | | 0.483663234 | 0.468088887 | 0.501268619 | 0.53332806 | 0.600350987 |
| a | | 0.734356729 | 0.766935029 | 0.742482876 | 0.7483409 | 0.726480253 |
| EXI | | 0.76393591 | 0.707171744 | 0.692230203 | 0.655863685 | 0.626946108 |
| G'/G" @ 0.1 sec−1 | | 0.941885807 | 0.683855624 | 0.467073869 | 0.281127468 | 0.101942742 |
| Density | | | | | | |
| I-2 CLB/DSR | (dg/min) | 0.882135832 | 0.847613792 | 0.872728995 | 0.866223992 | 0.889654986 |
| I-5 CLB/DSR | (dg/min) | 3.70268981 | 3.18322851 | 3.065715775 | 2.770245572 | 2.591299308 |
| I-10 CLB/DSR | (dg/min) | 12.33145614 | 9.879068409 | 9.417919079 | 8.125234715 | 7.23754871 |
| I-21 CLB/DSR | (dg/min) | 47.41757375 | 35.683351 | 35.04174067 | 30.17833241 | 27.65423272 |
| I-10/I-2 from CLB/DSR | | 13.97908994 | 11.65515297 | 10.79134431 | 9.380061959 | 8.135230873 |
| I-21/I-2 from CLB/DSR | | 53.75314326 | 42.09859646 | 40.15191526 | 34.83894777 | 31.08422158 |
| I-21/I-5 from CLB/DSR | | 12.80625064 | 11.20979876 | 11.43019876 | 10.89373907 | 10.6719562 |
| Cal. ETA (PaS) @ Shear Rate of | 100 | | | | | |
| Rheotens @ Freeport | | 782241 | 782242 | 782243 | 782244 | 782245 |
| Melt Strng. | (cN) | 11.9 | 12.3 | 11.8 | 9.8 | 4.6 |
| Draw Ratio @ Osc | (V/Vo) | | | | | 11.8 |
| Draw Ratio @ Brk | (V/Vo) | 11.7 | 11.4 | 12.4 | 13.4 | 19.4 |
| nMS | (cN) | | | | | |
| H-NMR | | hctl201312020921 | hctl201312020922 | hctl201312020923 | hctl201312020924 | hctl201312020925 |
| C13-NMR | | | | | | |
| SCB (/1000 C) | | 16.7 | 16.2 | 15.7 | 15.1 | 14.6 |
| wt % C4 | | | | | | |
| wt % C6 | | 10.02 | 9.72 | 9.42 | 9.06 | 8.76 |
| mole % C4 | | | | | | |
| mole % C6 | | 3.579082726 | 3.464499572 | 3.350405463 | 3.214133674 | 3.101104503 |
| Vinylene/1000 C | | 0.02 | 0.04 | 0.03 | 0.04 | 0.02 |
| TSO/1000 C | | 0.01 | 0.06 | 0.04 | 0.07 | 0.03 |
| Vinyl/1000 C | | 0 | 0.01 | 0.01 | 0.01 | 0 |
| Vinylidene/1000 C | | 0.01 | 0.01 | 0.01 | 0.01 | 0 |
| Total Unsaturation/1000 C | | 0.04 | 0.12 | 0.09 | 0.13 | 0.05 |
| GPC-3D | | hac825 | hac826 | hac827 | hac828 | hac829 |
| DRI Detector | | | | | | |
| Mn | | 27734 | 27180 | 28923 | 33429 | 37282 |
| Mw | | 166343 | 153721 | 147554 | 136696 | 128601 |
| Mz | | 805450 | 652030 | 553372 | 440526 | 326282 |
| Mw/Mn | | 5.997800534 | 5.655665931 | 5.101614632 | 4.089144156 | 3.449412585 |
| Mz/Mw | | 4.842103365 | 4.241645579 | 3.750301585 | 3.222669281 | 2.537165341 |
| Recovery (%) | | 0.931 | 0.929 | 0.929 | 0.945 | 0.937 |
| g' (Vis. Ave.) | | 0.875 | 0.894 | 0.919 | 0.956 | 0.983 |
| [n] Intr Vis (dl/g) | | 1.693 | 1.682 | 1.665 | 1.655 | 1.649 |

TABLE 2-continued

Second Pass

| | | Description | | | | |
|---|---|---|---|---|---|---|
| | | 100% BCT145629 (VP + 5% UNIV08) | 75% BCT145629 25% BCT146530 | 50% BCT145629 50% BCT146530 | 25% BCT145629 75% BCT146530 | 100% BCT146530 (VP/G5 Control) |
| Description | | 2nd Pass 100% BCT145629 (VP + 5% UNIV08) | 2nd Pass 75% BCT145629 25% BCT146530 | 2nd Pass 50% BCT145629 50% BCT146530 | 2nd Pass 25% BCT145629 75% BCT146530 | 2nd Pass 100% BCT146530 (VP/G5 Control) |
| Description | | UT00454-091-010 100% BCT145629 (VP + 5% UNIV08) | UT00454-091-070 75% BCT145629 25% BCT146530 | UT00454-091-080 50% BCT145629 50% BCT146530 | UT00454-091-090 25% BCT145629 75% BCT146530 | UT00454-091-050 100% BCT146530 (VP/G5 Control) |
| S131121: Small NGMCN/UHMW Blends | | BCT-158567 | BCT-158568 | BCT-158569 | BCT-158570 | BCT-158571 |
| MKD - # | | 340114-A6 | 340114-B1 | 340114-B2 | 340114-B3 | 340114-B4 |
| CTL- NB# | | UT00454-091-060 | UT00454-091-070 | UT00454-091-080 | UT00454-091-090 | UT00454-091-100 |
| TSP - FP# | | 782246 | 782247 | 782248 | 782249 | 782250 |
| BCT-145629 | (g) | 70 | 52.5 | 35 | 17.5 | 0 |
| BCT-146530 | (g) | 0 | 17.5 | 35 | 52.5 | 70 |
| Irganox 1076 | (g) | 0.021 | 0.021 | 0.021 | 0.021 | 0.021 |
| Irgafos 168 | (g) | 0.098 | 0.098 | 0.098 | 0.098 | 0.098 |
| wt % of (VP + 5% UNIV08) added to VP/G5-Control | (%) | 1 | 0.75 | 0.5 | 0.25 | 0 |
| Extrusion Pass | | 2 | 2 | 2 | 2 | 2 |
| DSR @ 190° C. | | BCT-158567 | BCT-158568 | BCT-158569 | BCT-158570 | BCT-158571 |
| A1 (Pa · s) | (Pa · s) | 177201.9136 | 41288.5379 | 20007.04554 | 13916.31142 | 9614.495433 |
| A2 (sec) | (sec) | 456.1619921 | 13.75342819 | 1.901570524 | | 0.142189304 |
| A3 | | 0.468662836 | 0.472403714 | 0.497783648 | 0.532020085 | 0.593781913 |
| a | | 0.660069679 | 0.723416531 | 0.701133422 | 0.763547484 | 0.729634691 |
| EXI | | 0.746502334 | 0.709616176 | 0.686729759 | 0.652192258 | 0.619680705 |
| G'/G" @ 0.1 sec−1 | | 0.899838867 | 0.652509199 | 0.44910322 | 0.27559268 | 0.106510167 |
| Density | | | | | | |
| I-2 CLB/DSR | (dg/min) | 0.972034194 | 0.893904211 | 0.919450795 | 0.850494536 | 0.886147903 |
| I-5 CLB/DSR | (dg/min) | 3.987176121 | 3.357709118 | 3.208491179 | 2.707820631 | 2.571227083 |
| I-10 CLB/DSR | (dg/min) | 12.92709362 | 10.46375403 | 9.781860288 | 7.903002298 | 7.119229322 |
| I-21 CLB/DSR | (dg/min) | 48.04023486 | 38.07735799 | 36.04124448 | 29.17367128 | 26.68545326 |
| I-10/I-2 from CLB/DSR | | 13.29901119 | 11.70567708 | 10.6388078 | 9.292243465 | 8.033906411 |
| I-21/I-2 from CLB/DSR | | 49.42237131 | 42.59668712 | 39.19866587 | 34.30200905 | 30.11399469 |
| I-21/I-5 from CLB/DSR | | 12.04868644 | 11.34027894 | 11.23308199 | 10.77385664 | 10.37848949 |
| Cal. ETA (PaS) @ Shear Rate of | 100 | | | | | |
| Rheotens @ Freeport | | 782246 | 782247 | 782248 | 782249 | 782250 |
| TSP - FP# | | 782246 | 782247 | 782248 | 782249 | 782250 |
| Melt Strng. | (cN) | 10.8 | 11.4 | 10.2 | 9.4 | 4.9 |
| Draw Ratio @ Osc | (V/Vo) | | | | | 15.6 |
| Draw Ratio @ Brk | (V/Vo) | 11.1 | 11.5 | 12.5 | 13.6 | 20.6 |
| nMS | (cN) | | | | | |
| H-NMR | | hctl201312020926 | hctl201312020927 | hctl201312020928 | hctl201312020929 | hctl201312020910 |
| C13-NMR | | | | | | |
| SCB (/1000 C) | | 16.9 | 16.3 | 15.6 | 15.1 | 14.5 |
| wt % C4 | | | | | | |
| wt % C6 | | 10.14 | 9.78 | 9.36 | 9.06 | 8.7 |
| mole % C4 | | | | | | |
| mole % C6 | | 3.625053625 | 3.487376979 | 3.327645051 | 3.214133674 | 3.078556263 |
| Vinylene/1000 C | | 0.02 | 0.03 | 0.01 | 0.04 | 0.05 |
| TSO/1000 C | | 0.02 | 0.05 | 0.02 | 0.05 | 0.07 |
| Vinyl/1000 C | | 0.01 | 0.01 | 0.01 | 0 | 0 |
| Vinylidene/1000 C | | 0 | 0.01 | 0.01 | 0 | 0 |
| Total Unsaturation/1000 C | | 0.05 | 0.1 | 0.05 | 0.09 | 0.12 |
| GPC-3D | | hac830 | hac831 | hac832 | hac833 | hac834 |
| DRI Detector | | | | | | |
| Mn | | 25622 | 29725 | 27233 | 32389 | 34422 |
| Mw | | 154614 | 156890 | 141518 | 138869 | 128734 |
| Mz | | 670010 | 704301 | 518511 | 446932 | 339146 |
| Mw/Mn | | 6.034423542 | 5.27804878 | 5.196562993 | 4.287535892 | 3.739875661 |
| Mz/Mw | | 4.333436817 | 4.489138887 | 3.663922611 | 3.218371271 | 2.63447108 |
| Recovery (%) | | 0.955 | 0.927 | 0.942 | 0.97 | 0.993 |
| g' (Vis. Ave.) | | 0.875 | 0.908 | 0.929 | 0.936 | 0.974 |
| [n] Intr Vis (dl/g) | | 1.67 | 1.717 | 1.657 | 1.632 | 1.611 |

In a second study, polyethylene compositions were made from the first polyolefin composition (Catalyst A+5 mol % Catalyst B) (BCT145629) and the second polyolefin composition (Catalyst A) (BCT146530) using extruder mixing. Polyethylene compositions were produced in the following ratios with Irganox™ 1076 antioxidant and Irgafos™ 168 antioxidant (both from BASF Corp., Florham Park, N.J.): 100/0, 75/25, 50/50, 25/75, and 0/100 of the first polyethylene composition and the second polyethylene composition as shown in Table 3. A miniature twin screw extruder (fully configurable 40 L/D co-rotating screws) utilizing the Thermo Scientific Process 11 was employed. In particular, a multiple-pass (e.g., two passes) extrusion process using a "standard" screw configuration was employed. The extruder temperature was set as follows: 170° C./175° C./180° C./185° C./185° C./190° C./195° C./200° C., at 200 rpm with a 25% feed rate. 200 g batch was prepared, extruded, and pelletized, in the first pass. In the second pass, about half of the pellets were re-extruded, passing about 100 g for each of the two passes. The polyethylene compositions and their properties are shown below in Table 3. As can be seen in Table 3 and FIG. 2, the polyethylene compositions made from the first polyolefin composition and the second polyolefin composition have higher melt strengths than either of its individual components in both passes.

TABLE 3

| | First Pass | | | | |
|---|---|---|---|---|---|
| | Description | | | | |
| | 1st Pass 100% BCT145629 (VP + 5% UNIV08) | 1st Pass 75% BCT145629 25% BCT146530 | 1st Pass 50% BCT145629 50% BCT146530 | 1st Pass 25% BCT145629 75% BCT146530 | 1st Pass 100% BCT146530 (VP/G5 Control) |
| BCT # | BCT-163102 | BCT-163103 | BCT-163104 | BCT-163105 | BCT-163106 |
| CTL NB# | UT00454-101-010 | UT00454-101-020 | UT00454-101-030 | UT00454-101-040 | UT00454-101-050 |
| MKD'S NB# | 00466-04-01 | 00466-05-01 | 00466-05-03 | 00466-05-05 | 00466-04-03 |
| wt % of (VP + 5% UNIV08) added to VP/G5-Control | 1 | 0.75 | 0.5 | 0.25 | 0 |
| BCT-145629 | 100 | 75 | 50 | 25 | 0 |
| BCT-146530 | 0 | 25 | 50 | 75 | 100 |
| Irganox 1076 | 0.03 | 0.03 | 0.03 | 0.03 | 0.03 |
| Irgafos 168 | 0.14 | 0.14 | 0.14 | 0.14 | 0.14 |
| Compounding | Thermal Scientific Process 11 Standard Screw | Thermal Scientific Process 11 Standard Screw | Thermal Scientific Process 11 Standard Screw | Thermal Scientific Process 11 Standard Screw | Thermal Scientific Process 11 Standard Screw |
| Extruder Passes | 1 | 1 | 1 | 1 | 1 |
| Torque (%) | 57-58 | 60-62 | 59-60 | 55-56 | 54-55 |
| Melt Temp. (° C.) | 204 | 202 | 203 | 203 | 202 |
| Melt Press, (bar) | 17-23 | 30-34 | 26-30 | 26-30 | 22-26 |
| Resin Testing | | | | | |
| Density (g/cm3) | 0.91849734 | 0.918789894 | 0.919095745 | 0.919335106 | 0.919933511 |
| I2-ASTM (dg/min) | 0.3112 | 0.3504 | 0.4418 | 0.5836 | 0.8276 |
| I21-ASTM (dg/min) | 27.597 | 23.482 | 21.297 | 22.079 | 26.342 |
| MFR-ASTM (I21/I2) | 88.67930591 | 67.01484018 | 48.20507017 | 37.83241947 | 31.82938618 |
| SAOS | DFS @ 190 C. | DFS @ 190 C. | DFS @ 190 C. | DFS @ 190 C. | DFS @ 190 C. |
| A1 (Pa · s) | 91396526.48 | 487530.838 | 68720.53964 | 22209.11435 | 10394.25246 |
| A2 (sec) | 64399353.51 | 4479.641881 | 62.77114357 | 2.463867699 | 0.168644405 |
| A3 | 0.496558469 | 0.448748073 | 0.432549821 | 0.464308026 | 0.585510641 |
| a (shifting) | 0.945358473 | 0.867624534 | 0.802138659 | 0.770934517 | 0.764307373 |
| EXI (G'/G")0.1 s−1 | 0.802410669 | 0.72010948 | 0.665133383 | 0.637193996 | 0.623893315 |
| I-2 (CLB/DSR) | 0.701153529 | 0.757768012 | 0.813596291 | 0.843234788 | 0.849501938 |
| I-5 (CLB/DSR) | 3.198390554 | 2.99549463 | 2.916715796 | 2.786568771 | 2.492038202 |
| I-10 (CLB/DSR) | 11.20229769 | 9.362457875 | 8.567073568 | 7.97185134 | 6.951668183 |
| I-21 (CLB/DSR) | 45.09286484 | 33.29274265 | 28.79953998 | 27.01367974 | 26.03722894 |
| I21/I2 (CLB/DSR) | 64.31239808 | 43.93527057 | 35.39782603 | 32.03577476 | 30.64999358 |
| I21/I5 (CLB/DSR) | 14.09861119 | 11.11427219 | 9.873961671 | 9.694244771 | 10.44816605 |
| I10/I2 (CLB/DSR) | 15.97695402 | 12.35530891 | 10.52988277 | 9.453892857 | 8.183228163 |
| H-NMR | hctl20140301661 | hctl20140301662 | hctl20140301663 | hctl20140301664 | hctl20140301665 |
| SCB (/1000 C) | 16.8 | 16.5 | 15.7 | 15.4 | 14.7 |
| wt % C4 | | | | | |
| wt % C6 | 10.08 | 9.9 | 9.42 | 9.24 | 8.82 |
| mole % C4 | | | | | |
| mole % C6 | 3.602058319 | 3.533190578 | 3.350405463 | 3.282182438 | 3.123671908 |
| Rheotens @ Freeport | 792526 | 792527 | 792528 | 792529 | 792530 |
| Melt Strng. (cN) | 13.6 | 14 | 13.2 | 11.4 | 5.1 |
| Draw Ratio @ Osc (V/Vo) | | | | | |
| Draw Ratio @ Brk (V/Vo) | 9.7 | 11.7 | 11.6 | 12.2 | 21.4 |
| nMS (cN) | | | | | |
| GPC-3D | had077 | had078 | had079 | had080 | had081 |
| DRI Detector | | | | | |
| Mn | 27719 | 26889 | 30299 | 30807 | 37624 |
| Mw | 167327 | 169311 | 146480 | 142477 | 139248 |
| Mz | 745678 | 817291 | 515715 | 469245 | 403733 |
| Mw/Mn | 6.03654533 | 6.296664063 | 4.834482986 | 4.624825527 | 3.701041888 |
| Mz/Mw | 4.456411697 | 4.827158306 | 3.520719552 | 3.293478947 | 2.899380961 |
| Recovery (%) | 0.922 | 0.996 | 0.93 | 0.965 | 0.942 |
| g' (Vis. Ave.) | 0.873 | 0.9 | 0.928 | 0.948 | 0.985 |
| [n] Intr Vis (dl/g) | 1.748 | 1.714 | 1.689 | 1.648 | 1.685 |

TABLE 3-continued

| | Second Pass | | | | |
|---|---|---|---|---|---|
| | Description | | | | |
| | 2nd Pass 100% BCT145629 (VP + 5% UNIV08) | 2nd Pass 75% BCT145629 25% BCT146530 | 2nd Pass 50% BCT145629 50% BCT146530 | 2nd Pass 25% BCT145629 75% BCT146530 | 2nd Pass 100% BCT146530 (VP/G5 Control) |
| BCT # | BCT-163107 | BCT-163108 | BCT-163109 | BCT-163110 | BCT-163111 |
| CTL NB# | UT00454-101-060 | UT00454-101-070 | UT00454-101-080 | UT00454-101-090 | UT00454-101-100 |
| MKD'S NB# | 00466-04-02 | 00466-05-02 | 00466-05-04 | 00466-05-06 | 00466-04-04 |
| wt % of (VP + 5% UNIV08) added to VP/G5-Control | 1 | 0.75 | 0.5 | 0.25 | 0 |
| BCT-145629 | 100 | 75 | 50 | 25 | 0 |
| BCT-146530 | 0 | 25 | 50 | 75 | 100 |
| Irganox 1076 | 0.03 | 0.03 | 0.03 | 0.03 | 0.03 |
| Irgafos 168 | 0.14 | 0.14 | 0.14 | 0.14 | 0.14 |
| Compounding | Thermal Scientific Process 11 Standard Screw | Thermal Scientific Process 11 Standard Screw | Thermal Scientific Process 11 Standard Screw | Thermal Scientific Process 11 Standard Screw | Thermal Scientific Process 11 Standard Screw |
| Extruder Passes | 2 | 2 | 2 | 2 | 2 |
| Torque (%) | 57-58 | 60-61 | 53-58 | 54-56 | 55-56 |
| Melt Temp. (° C.) | 204 | 203 | 203 | 203 | 203 |
| Melt Press. (bar) | 17-23 | 26-28 | 24-29 | 26-28 | 22-26 |
| Resin Testing | | | | | |
| Density (g/cm3) | 0.918430851 | 0.918922872 | 0.91900266 | 0.919574468 | 0.919734043 |
| I2-ASTM (dg/min) | 0.3549 | 0.375 | 0.4537 | 0.5858 | 0.8398 |
| I21-ASTM (dg/min) | 30.275 | 23.509 | 21.394 | 22.388 | 26.38 |
| MFR-ASTM (I21/I2) | 85.30571992 | 62.69066667 | 47.15450738 | 38.21782178 | 31.41224101 |
| SAOS | DFS @ 190 C. | DFS @ 190 C. | DFS @ 190 C. | DFS @ 190 C. | DFS @ 190 C. |
| A1 (Pa · s) | 90418846.75 | 378990.059 | 70915.67066 | 24470.41104 | 10887.00011 |
| A2 (sec) | 65007560.94 | 2530.06323 | 65.67276854 | 3.081086578 | 0.188094358 |
| A3 | 0.49599459 | 0.448395752 | 0.433289576 | 0.459422481 | 0.577491225 |
| a (shifting) | 0.936494337 | 0.872941928 | 0.815687564 | 0.805811685 | 0.782643318 |
| EXI (G'/G")0.1 s−1 | 0.801499409 | 0.718038884 | 0.666818497 | 0.636363251 | 0.623247359 |
| I-2 (CLB/DSR) | 0.707189202 | 0.753551628 | 0.801290415 | 0.809956183 | 0.831378896 |
| I-5 (CLB/DSR) | 3.220449044 | 2.96611962 | 2.879849019 | 2.684872855 | 2.451356897 |
| I-10 (CLB/DSR) | 11.26374611 | 9.249586776 | 8.4750607 | 7.670998115 | 6.842292465 |
| I-21 (CLB/DSR) | 45.2696355 | 32.83294985 | 28.54662081 | 25.85576777 | 25.40226263 |
| I21/I2 (CLB/DSR) | 64.01347101 | 43.5709361 | 35.6258109 | 31.92242781 | 30.55437511 |
| I21/I5 (CLB/DSR) | 14.05693271 | 11.06932762 | 9.912540767 | 9.630164692 | 10.36253133 |
| I10/I2 (CLB/DSR) | 15.92748599 | 12.27465568 | 10.57676535 | 9.470880374 | 8.23005311 |
| H-NMR | hctl20140301666 | hctl20140301667 | hctl20140301668 | hctl20140301669 | hctl201403016610 |
| SCB (/1000 C) | 16.8 | 16.3 | 15.7 | 15 | 14.6 |
| wt % C4 | | | | | |
| wt % C6 | 10.08 | 9.78 | 9.42 | 9 | 8.76 |
| mole % C4 | | | | | |
| mole % C6 | 3.602058319 | 3.487376979 | 3.350405463 | 3.191489362 | 3.101104503 |
| Rheotens @ Freeport | 792531 | 792532 | 792533 | 792534 | 792535 |
| Melt Strng. (cN) | 12.4 | 14 | 13.63 | 11.5 | 5.3 |
| Draw Ratio @ Osc (V/Vo) | | | | | |
| Draw Ratio @ Brk (V/Vo) | 12.8 | 12.1 | 12 | 13.4 | 21.3 |
| nMS (cN) | | | | | |
| GPC-3D DRI Detector | had082 | had083 | had084 | had085 | had086 |
| Mn | 26952 | 29313 | 32022 | 30638 | 35480 |
| Mw | 175885 | 155729 | 157536 | 147351 | 132626 |
| Mz | 831357 | 602459 | 618223 | 523490 | 347683 |
| Mw/Mn | 6.52586079 | 5.312625797 | 4.919617763 | 4.809419675 | 3.738049605 |
| Mz/Mw | 4.726707792 | 3.868637184 | 3.924328407 | 3.552673548 | 2.621529715 |
| Recovery (%) | 0.949 | 0.949 | 0.923 | 0.952 | 0.952 |
| g' (Vis. Ave.) | 0.86 | 0.9 | 0.928 | 0.951 | 1.002 |
| [n] Intr Vis (dl/g) | 1.723 | 1.692 | 1.705 | 1.672 | 1.687 |

As shown above, the inventive examples exhibit higher melt strength which is an indication of the ability to impart greater bubble stability and drawdown capability when blowing films such as high stalk films.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method comprising:
    mixing, using a multiple-pass extrusion process, from 50 to 99 wt % of a first polyolefin composition derived from a dual catalyst system comprising (a) a metallocene catalyst and (b) a biphenyl phenol catalyst with from 1 to 50 wt % of a second polyolefin composition derived from the (a) metallocene catalyst said wt % s based upon combined mass of first and second polyolefin compositions, and
    obtaining a polyolefin polymer composition;
    wherein the metallocene catalyst is represented by the formula:

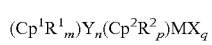

wherein: $Cp^1$ and $Cp^2$ are the same or different cyclopentadienyl rings; $R^1$ and $R^2$ are each, independently, a halogen, a hydrogen, or a hydrocarbyl, halocarbyl, hydrocarbyl-substituted organometalloid or halocarbyl-substituted organometalloid group having 1 to 20 carbon atoms; m is 0 to 5;
    p is 0 to 5; two $R^1$ and/or $R^2$ substituents on adjacent carbon atoms of the respective $Cp^1$ or $Cp^2$ associated therewith may be joined together to form a ring containing from 4 to about 20 carbon atoms; Y is a bridging group; n is a number of atoms in a direct chain between the $(Cp^1R^1_m)$ ligand and the $(Cp^2R^2_p)$ ligand and is 0 to 8; M is a transition metal having a valence of from 3 to 6; each X is independently, a hydrogen, a halogen or a hydrocarbyl, oxyhydrocarbyl, halocarbyl, hydrocarbyl-substituted organometalloid, oxyhydrocarbyl-substituted organometalloid, or halocarbyl-substituted organometalloid group having 1 to 20 carbon atoms; and q is equal to the valence of M minus 2; and
    further wherein the biphenyl phenol catalyst is a pryidyl-diamido transition metal complex represented by the formula (X):

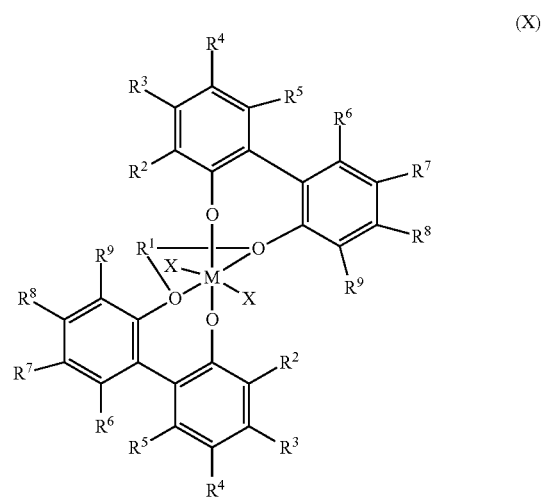

wherein M is Ti, Zr, or Hf;
    each $R^1$ through $R^9$ is independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and
    X is selected from the group consisting of F, Cl, Br, I, Me, benzonitrile (Bnz), $CH_2SiMe_3$, and $C_1$ to $C_5$ alkyls or alkenyls.

2. The method of claim 1, wherein the metallocene catalyst comprises bis(cyclopentadienyl)zirconium dichloride, bis(n-butylcyclopentadienyl)zirconium dichloride, bis (n-butylcyclopentadienyl)zirconium dimethyl, bis(pentamethylcyclopentadienyl)zirconium dichloride, bis (pentamethylcyclopentadienyl)zirconium dimethyl, bis (pentamethylcyclopentadienyl)hafnium dichloride, bis (pentamethylcyclopentadienyl)zirconium dimethyl, bis(1-methyl-3-n-butylcyclopentadienyl)zirconium dichloride, bis (1-methyl-3-n-butylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium dichloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl) zirconium dichloride, dimethylsilylbis(tetrahydroindenyl) zirconium dichloride, dimethylsilyl bis(tetrahydroindenyl) zirconium dimethyl, dimethyl-bis(indenyl)zirconium dichloride, dimethyl silyl(bisindenyl)zirconium dimethyl, dimethyl-bis(cyclopentadienyl)zirconium dichloride, dimethylsilylbis(cyclopentadienyl)zirconium dimethyl, or (n-propyl cyclopentadienyl)(pentamethyl cyclopentadienyl) zirconium dimethyl.

3. The method of claim 1, wherein the metallocene catalyst comprises bis(n-propyl cyclopentadienyl) hafnium dichloride, dimethyl, or dihydride; bis(n-butyl cyclopentadienyl) hafnium dichloride or dimethyl; bis(n-pentyl cyclopentadienyl) hafnium dichloride or dimethyl; (n-propyl cyclopentadienyl)(n-butyl cyclopentadienyl) hafnium dichloride or dimethyl; bis[(2-trimethylsilyl-ethyl)cyclopentadienyl] hafnium dichloride or dimethyl; bis(trimethylsilyl cyclopentadienyl) hafnium dichloride or dimethyl or dihydride; bis(2-n-propyl indenyl) hafnium dichloride or dimethyl; bis(2-n-butyl indenyl) hafnium dichloride or dimethyl; dimethylsilyl bis(n-propyl cyclopentadienyl) hafnium dichloride or dimethyl; dimethylsilyl bis(n-butyl cyclopentadienyl) hafnium dichloride or dimethyl; bis(9-n-propyl fluorenyl) hafnium dichloride or dimethyl; bis(9-n-butyl fluorenyl) hafnium dichloride or dimethyl; (9-n propyl fluorenyl)(2-n-propyl indenyl) hafnium dichloride or dimethyl; bis(1,2- n-propyl, methyl cyclopentadienyl) hafnium dichloride or dimethyl; (n-propyl cyclopentadienyl)(1,3-n-propyl, n-butyl cyclopentadienyl) hafnium dichloride or dimethyl.

4. The method of claim 1, wherein the biphenyl phenol catalyst is represented by the formula:

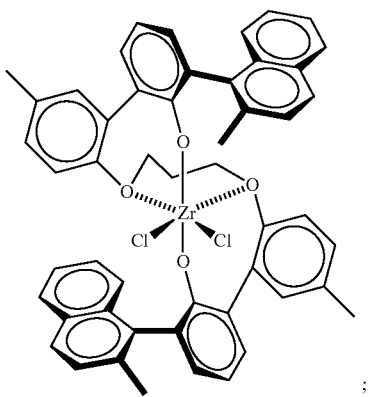

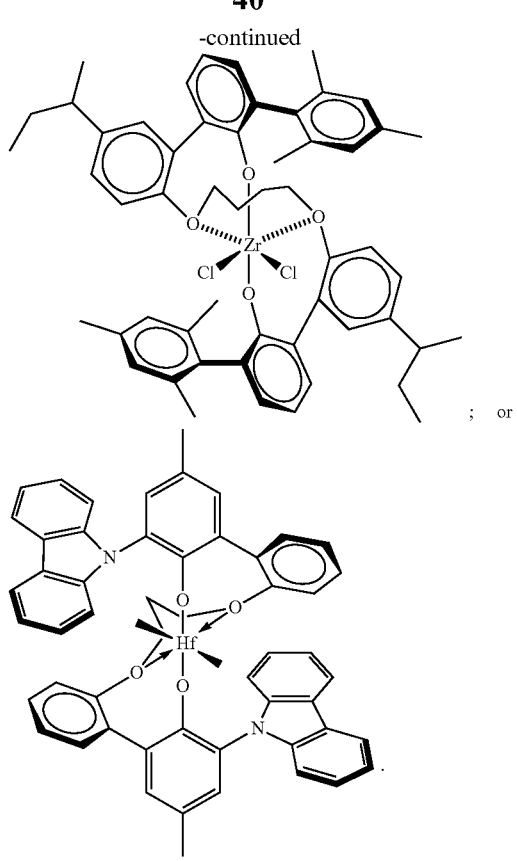

; or

5. The method of claim 1, wherein the polyolefin polymer composition comprises from 65 wt % to 99 wt % of the first polyolefin composition and from 35 wt % to 1 wt % of the second polyolefin composition.

6. The method of claim 1, wherein the polyolefin polymer composition has a melt strength of 10 cN or greater.

7. The method of claim 1, wherein the polyolefin polymer composition has a melt strength of 11 cN or greater.

8. The method of claim 1, wherein the polyolefin polymer composition has a density of from 0.900 g/cm$^3$ to 0.940 g/cm$^3$.

9. The method of claim 1, wherein the polyolefin polymer composition has a density of from 0.912 g/cm$^3$ to 0.930 g/cm$^3$.

10. The method of claim 1, wherein the polyolefin polymer composition has a weight average molecular weight ($M_w$) of from 50,000 g/mol to 250,000 g/mol.

11. The method of claim 1, wherein the polyolefin polymer composition has a weight average molecular weight ($M_w$) of from 80,000 g/mol to 150,000 g/mol.

12. The method of claim 1, wherein the polyolefin polymer composition has a melt index ($I_{2.16}$/190° C.) of from 0.05 g/10 min to 10.00 g/10 min.

13. The method of claim 1, wherein the polyolefin polymer composition has a melt index ($I_{2.16}$/190° C.) of from 0.10 g/10 min to 7.00 g/10 min.

* * * * *